(12) United States Patent
Yokota et al.

(10) Patent No.: US 8,850,210 B2
(45) Date of Patent: Sep. 30, 2014

(54) AUTHENTICATION SYSTEM, AUTHENTICATION DEVICE, TERMINAL, AND VERIFYING DEVICE

(75) Inventors: Kaoru Yokota, Hyogo (JP); Natsume Matsuzaki, Osaka (JP); Masao Nonaka, Osaka (JP)

(73) Assignee: Panasonic Corporation, Osaka (JP)

( * ) Notice: Subject to any disclaimer, the term of this patent is extended or adjusted under 35 U.S.C. 154(b) by 1618 days.

(21) Appl. No.: 11/916,643

(22) PCT Filed: Jun. 2, 2006

(86) PCT No.: PCT/JP2006/311075
§ 371 (c)(1),
(2), (4) Date: Dec. 5, 2007

(87) PCT Pub. No.: WO2006/132143
PCT Pub. Date: Dec. 14, 2006

(65) Prior Publication Data
US 2009/0106547 A1      Apr. 23, 2009

(30) Foreign Application Priority Data

Jun. 10, 2005 (JP) .................................. 2005-170628

(51) Int. Cl.
*H04L 9/32* (2006.01)
*H04L 29/06* (2006.01)
(52) U.S. Cl.
CPC .......... *H04L 9/3247* (2013.01); *H04L 63/0823* (2013.01); *H04L 2209/60* (2013.01)
USPC ............................. 713/176; 713/156; 713/175
(58) Field of Classification Search
CPC ......... G06F 21/31; G06F 12/60; G06F 21/62; H04L 63/0428
See application file for complete search history.

(56) References Cited

U.S. PATENT DOCUMENTS 6,178,243 B1 * 1/2001 Pomerantz et al. ........... 380/243
6,266,680 B1 * 7/2001 Song et al. .................... 715/206

(Continued)

FOREIGN PATENT DOCUMENTS

EP     1 498 799       1/2005
JP     2000-99469      4/2000

(Continued)

OTHER PUBLICATIONS

International Search Report issued Aug. 8, 2006 in the International (PCT) Application of which the present application is the U.S. National Stage.

(Continued)

*Primary Examiner* — Fatoumata Traore
(74) *Attorney, Agent, or Firm* — Wenderoth, Lind & Ponack, L.L.P.

(57) ABSTRACT

An authentication system, including a service use device 1 which presents blurred information obtained by blurring certification information desired to be certified, service providing devices 3a to 3c which verify the validity of blurred information presented by the service use device 1, and an authentication device 2 which supports the service use device 1 to issue valid blurred information. The authentication device 2 adds a digital signature to information including certification information and blurred information, and generates authentication information including the obtained digital signature, certification information, and blurred information (S2). The service use device 1 generates, based on the authentication information generated in the authentication device 2, blurred authentication information including blurred information selected according to an instruction from a user, instruction information representing the instruction, and a digital signature (S4). The service providing devices 3a to 3c verify the validity of blurred information indicated by instruction information included in the blurred authentication information generated by the service use device 1, based on the digital signature included in the blurred authentication information (S6).

13 Claims, 17 Drawing Sheets

(56) References Cited

U.S. PATENT DOCUMENTS

| | | |
|---|---|---|
| 6,401,206 B1 * | 6/2002 | Khan et al. .................... 713/176 |
| 6,560,620 B1 * | 5/2003 | Ching ........................... 715/229 |
| 6,772,342 B1 * | 8/2004 | Hawthorne ................... 713/176 |
| 6,948,657 B2 * | 9/2005 | Sugino et al. ................ 235/436 |
| 6,978,367 B1 * | 12/2005 | Hind et al. .................... 713/167 |
| 7,130,445 B2 * | 10/2006 | Ruhl et al. .................... 382/100 |
| 7,243,304 B2 | 7/2007 | Sato |
| 7,272,610 B2 * | 9/2007 | Torres ........................... 707/101 |
| 7,475,242 B2 * | 1/2009 | Baird et al. ................... 713/166 |
| 7,526,645 B2 * | 4/2009 | Miyazaki et al. ............. 713/167 |
| 2003/0005312 A1 | 1/2003 | Sato |
| 2003/0009549 A1 * | 1/2003 | Maehiro ........................ 709/223 |
| 2003/0115481 A1 * | 6/2003 | Baird et al. ................... 713/201 |
| 2003/0147548 A1 * | 8/2003 | Ruhl et al. .................... 382/100 |
| 2004/0079800 A1 * | 4/2004 | Sugino et al. ................ 235/436 |
| 2004/0088313 A1 * | 5/2004 | Torres ........................... 707/101 |
| 2005/0015600 A1 * | 1/2005 | Miyazaki et al. ............. 713/176 |
| 2005/0235163 A1 * | 10/2005 | Forlenza et al. ............. 713/193 |
| 2006/0242558 A1 * | 10/2006 | Racovolis et al. ............ 715/511 |

FOREIGN PATENT DOCUMENTS

| | | |
|---|---|---|
| JP | 2001-283122 | 10/2001 |
| JP | 2003-16064 | 1/2003 |
| JP | 2003-345752 | 12/2003 |
| JP | 2005-050311 | 2/2005 |
| JP | 2005-051734 | 2/2005 |

OTHER PUBLICATIONS

Kunihiko Miyazaki et al., "Digital Document Sanitizing Problem (Denshi Bunsho Suminuri Mondai)", Technical Report of IEICE, ISEC2003-20, The Institute of Electronics, Information and Communication Engineers, Jul. 2003, pp. 61-67 (English translation).

Full machine translation of Japanese Patent Application Publication No. 2003-345752, published Dec. 5, 2003.

Full machine translation of Japanese Patent Application Publication No. 2005-51734, published Feb. 24, 2005.

* cited by examiner

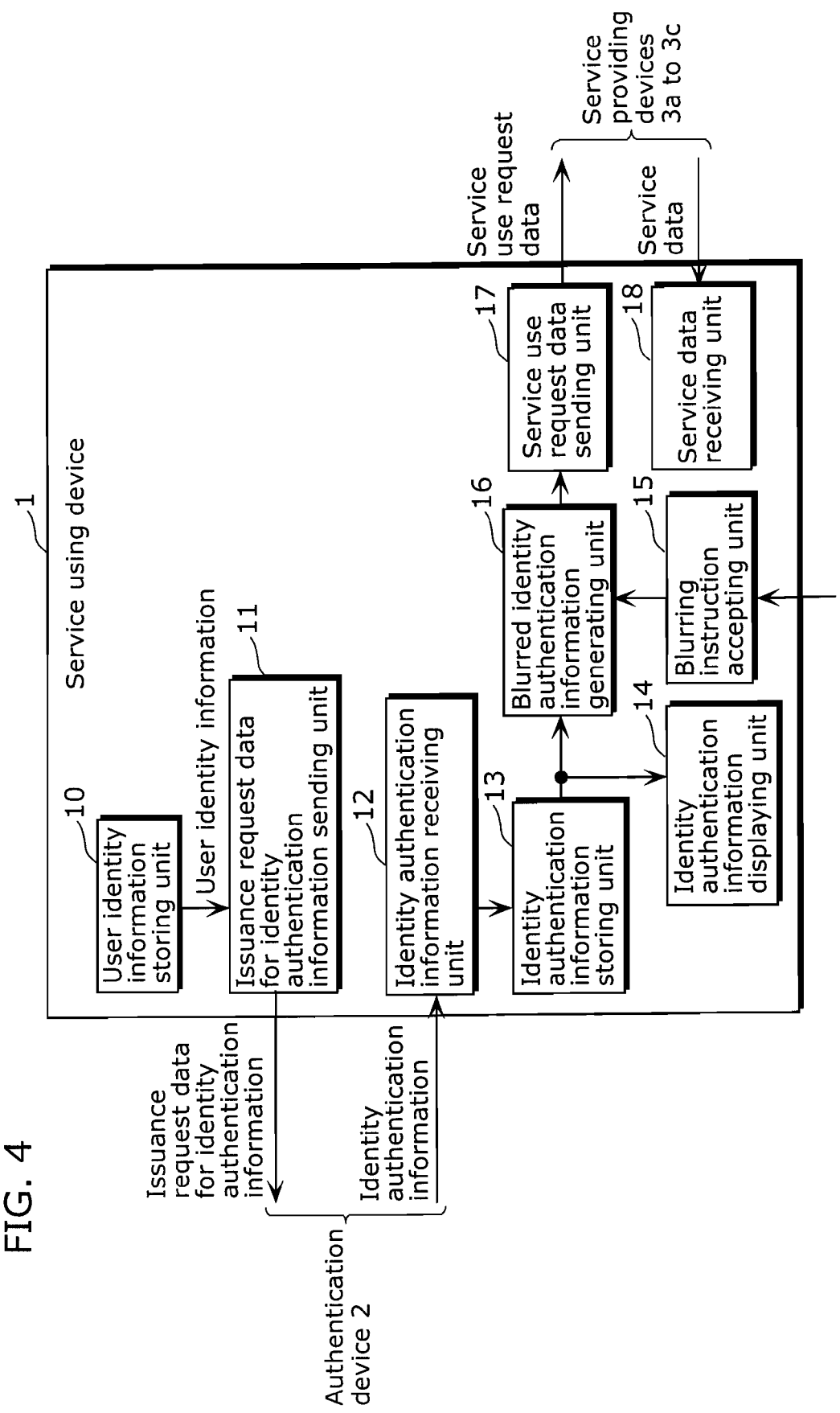

AUTHENTICATION SYSTEM, AUTHENTICATION DEVICE, TERMINAL, AND VERIFYING DEVICE

TECHNICAL FIELD

The present invention relates to an authentication system which accurately authenticates identity of a holder of a certificate data such as an identity certificate authenticated by a third-party institution, while securing privacy of the holder.

BACKGROUND ART

In recent years, with the spread use of the internet in general households, a variety of services are increasingly provided such as sales of a product via a network and delivery of digital contents like music and movie. In providing such a service, the service provision side needs to obtain user's personal information from the user. As for the sales of a product via a network, for example, a name, an address, and a telephone number of the user may be required for delivering the product, and a credit card number may be also required for charging the product. Further, an age, an occupation and the like of the user may be required so that purchase trends of the product can be studied and then used in future sales activities. Moreover, in obtaining personal information from the user, the service provision side desires to confirm that contents of the obtained personal information are correct, namely that the user has declared correct personal information of his or her own without falsity. Meanwhile, the user side desires not to provide the service provision side with his or her personal information more than necessary. For satisfying the desires of both the service provision side and user side, it is desirable to realize a mechanism where personal information more than necessary does not need to be provided to the service provision side, while the validity of the personal information provided by the user side is secured.

As a conventional method for realizing such a mechanism, a method called an "electronic black-out method" is disclosed (see Patent Document 1). FIG. 1 is a block diagram showing an authentication system using the electronic black-out method. This authentication system includes: a signature generator 90 which authenticates contents of a message and adds a digital signature, to generate a message with a signature; an electronic black-out performer 91 which accepts the message with the signature and, if necessary, "electronically blacks out" the message and sends the message to a signature verifier 92; and the signature verifier 92 which verifies the validity of the "electronically blacked out" message with the signature received from the electronic black-out performer 91.

In this authentication system, a series of procedures of adding a signature to a message, performing electronic black-out, and verifying the signature is as follows. First, the signature generator 90 generates a digital signature S with respect to a message M made up of several data blocks. "A message M made up of several data blocks" here means that, for example when the message M is a sentence that "criminal TARO YAMADA pleaded guilty", this message can be divided into four data blocks of "criminal", "TARO YAMADA", "pleaded", and "guilty". Next, the electronic black-out performer 91 having received the message M and the digital signature S verifies the digital signature if necessary, and subsequently "blacks out" some of the four data blocks in the message M. For example, when the message M is a sentence made up of the four data blocks cited in the above example, it is assumed that the electronic black-out performer 91 electronically blacks out "TARO YAMADA". At this time, the portion "TARO YAMADA" is made invisible (blacked out) in the message M as representing "criminal •••• •••••• pleaded guilty". A message Ms after blacked out as thus generated and the signature S having been added to the original message M are then sent to the signature verifier 92. The signature verifier 92 verifies that a constant relation is established between the blacked-out message Ms and the signature S to verify the validity of the blacked-out message Ms. Here, the signature verifier 92 is capable of confirming that the message Ms has been generated by blacking out a part of the original message M, but it is incapable of finding out the original contents of the blacked-out data block ("TARO YAMADA" in this example). As thus described, according to the electronic black-out method, the validity of a message can be authenticated while a part of the original message is concealed. In this example, the validity of a content of the message (that the criminal pleaded crime) can be confirmed, while personal privacy (the name of the criminal) is protected, by concealing the part of the message.

Another example is a message made up of three data blocks of "name=TARO YAMADA", "age=23 years old", and "address=Kadoma City, Osaka Prefecture". In the case where only the name and address are needed while the age is not needed, the "age=23 years old" is "electronically blacked out". The use of the "electronic black-out method" makes it possible to confirm that the contents of the message with a digital signature are correct by verifying the other items (the name and the address) other than the age.

Patent Document 1: Japanese Unexamined Application Publication No. 2005-51734

DISCLOSURE OF INVENTION

Problems that Invention is to Solve

However, the above prior art has a problem of being incapable of protecting personal privacy and confirming the validity of the personal information concurrently in a use case as described below.

For example, when only a name and "being equal to or older than 20 years old" need to be confirmed, in the prior art, either presenting a correct age (23 years old) in the data block or blacking out and not presenting the age at all has to be selected, and it is impossible to present only "being equal to or older than 20 years old" without presenting the correct age. Thus, the correct age (23 years old) is presented for presenting "being equal to or older than 20 years old", which means presentation of personal information more than necessary, thereby preventing sufficient protection of personal privacy.

Accordingly, the present invention has been conceived to solve the above problem, and has an object to provide an authentication system capable of sufficiently protecting personal privacy and also confirming the validity of personal information presented by the service provision side even in the use case as described above.

Means to Solve the Problems

In order to achieve the above object, the present invention includes: a terminal which presents blurred information obtained by blurring certification information desired to be certified; a verifying device which verifies the validity of the blurred information presented by the terminal; and an authentication device which supports the terminal to issue valid blurred information. The authentication device includes: an information holding unit which holds at least one piece of certification information and pieces of blurred information corresponding to the at least one piece of certification information; an authentication information generating unit which generates a digital signature by performing a digital signature generation process on information including the certification information and the blurred information which are held in the information holding unit, and generate, as authentication information, information which includes: the generated digital signature, the certification information, and the blurred information; and a first transmission unit which transmits the generated authentication information to the terminal. The terminal includes: a first receiving unit which receives the authentication information transmitted from the authentication device; a blurring instruction accepting unit which accepts an instruction indicating that at least one piece of the blurred information is selected from among the pieces of the blurred information included in the authentication information received by the receiving unit according to the instruction from a user; a blurred authentication information generating unit which generates, as blurred authentication information, information which includes: the digital signature, the blurred information selected according to the instruction accepted by the blurring instruction accepting unit, and the instruction information indicating the instruction; and a second transmission unit which transmits the generated blurred authentication information to the verifying device. The verifying device includes: a second receiving unit which receives the blurred authentication information transmitted from the terminal; and a signature verifying unit which verifies the validity of the blurred information which is included in the blurred authentication information and which is indicated by the instruction information included in the blurred authentication information, according to the digital signature included in the blurred authentication information received by the receiving unit.

Thereby, the authentication device prepares plural pieces of valid blurred information, the terminal substitutes blurred information desired by the user for certification information and sends the information to the verifying device, and the verifying device verifies the validity of the blurred information. Namely, this enables the user to substitute blurred information for desired certification information and present the blurred information, and this enables the verifying device which received the blurred information to confirm that the blurred information has been issued with validity by the authentication device.

Note that the present invention can be realized not only as the authentication system as thus described but can also be realized as an independent authentication device, an independent terminal, and an independent verifying device which constitute the authentication system, as a program to be executed in these authentication device, the terminal, and the verifying device, and as a computer-readable recording medium such as a CD-ROM in which the program is recorded.

Effects of the Invention

With the authentication system of the present invention, it is possible to obtain an effect of realizing an authentication system in which identity information of a user can be changed to blurred identity information obtained by blurring the identity information, and the validity of the blurred identity information can be confirmed by a digital signature.

Namely, it is possible to realize an authentication system which is capable of transmitting only minimal required information to be certified, since the validity of the personal information can be confirmed without exposing personal information more than necessary

BRIEF DESCRIPTION OF DRAWINGS

FIG. 4 is a block diagram showing a structure of a service using device according to the embodiment of the present invention.

NUMERICAL REFERENCES

Figure 1:
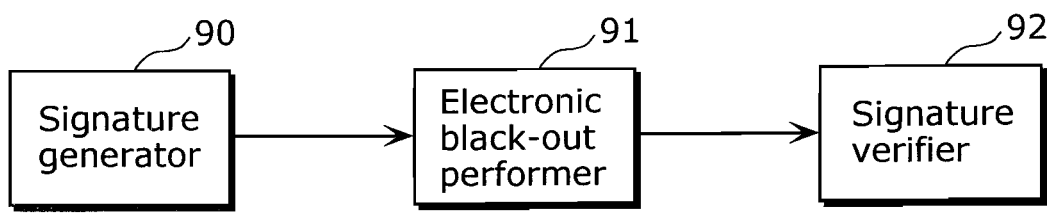
FIG. 1 is a diagram showing a configuration of an authentication system according to a prior art to the present invention.

1 Service using device
2 Authentication device
3*a* to 3*c* Service providing devices 10 User identity information storing unit
11 Issuance request data for identity authentication information sending unit
12 Identity authentication information receiving unit
13 Identity authentication information storing unit
14 Identity authentication information displaying unit
15 Blurring instruction accepting unit
16 Blurred identity authentication information generating unit
17 Service use request data sending unit
18 Service data receiving unit
20 Issuance request data for identity authentication information receiving unit
21 User identity information confirming unit
22 Information-for-blurring generating unit
23 Identity authentication information generating unit
24 Identity authentication information transmitting unit
30 Data dividing unit
31 Signature verification key storing unit
32 Digital signature verifying unit
33 User identity information confirming unit
34 User identity information storing unit
35 service data sending permitting unit
36 Service data storing unit
37 Service data sending unit

BEST MODE FOR CARRYING OUT THE INVENTION

With reference to the drawings, an embodiment of the present invention will be described in details below.

(Overview of Authentication System)

Figure 2:
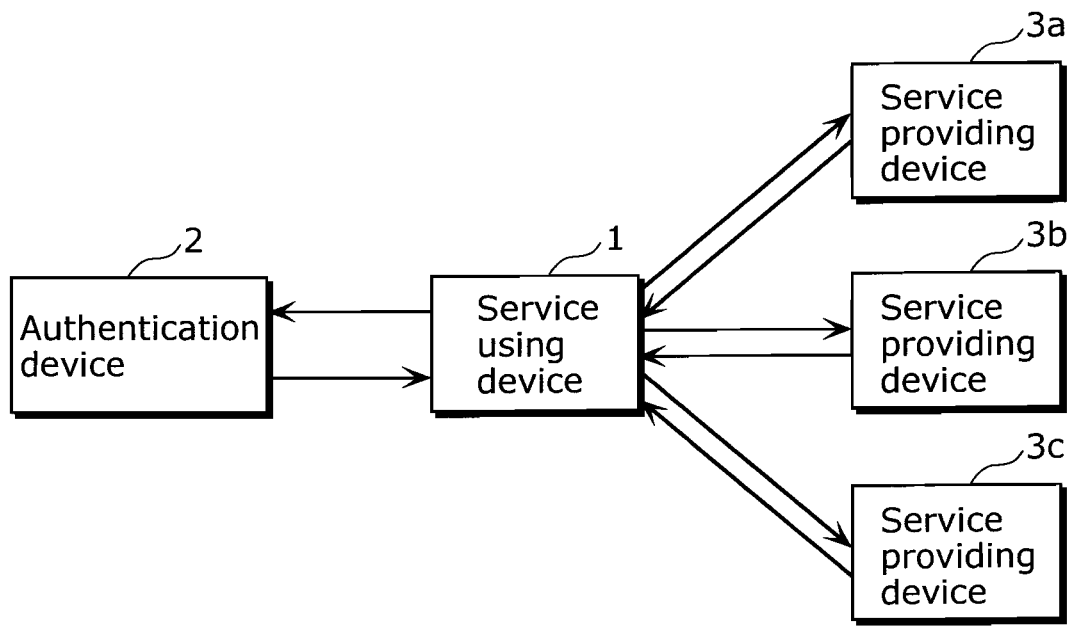
FIG. 2 is a diagram showing a configuration of an authentication system according to an embodiment of the present invention.

FIG. 2 is a diagram showing an example of a configuration of an authentication system in the embodiment of the present invention. This authentication system is capable of transmitting only minimal necessary information to be certified while confirming the validity of personal information without exposing the personal information more than necessary, and is structured with a service using device 1, an authentication device 2, and service providing devices 3a to 3c, which are connected through a communication network such as the internet. The service using device 1 is an example of a terminal which presents blurred information obtained by blurring certification information which is information desired to be certified (here, information showing contents obtained by obscuring contents of the certification information), the service providing devices 3a to 3c each is an example of the verifying device which verifies the validity of blurred information presented by the service using device 1, and the authentication device 2 is an example of an authentication device which supports the service using device 1 to issue valid blurred information.

In the present embodiment, using the service using device 1, the service user uses a variety of services provided by the service providing devices 3a to 3c of the service provider. The service providing devices 3a to 3c request the user to present his or her personal information necessary for providing a service when the user uses the service. At this time, the service providing devices 3a to 3c permit the user to present not first-hand information but information partly obscured (made abstract). For example, as for the name and the address, it is permitted to present only the initials of the name and the name of the region including the address ("Kinki Region", etc.).

The service using device 1 holds an identity certificate issued by the authentication device 2 which is an authentication institution, and presents this identity certificate in response to the request for presenting personal information. At this time, the service using device 1 presents, to the service providing devices 3a to 3c, an identity certificate obtained by performing a blurring process on information of the above identity certificate according to the contents of the personal information required by the service providing devices 3a to 3c. For example, only the initials of a "name" and only the name of the region including an "address" are presented.

Figure 3:
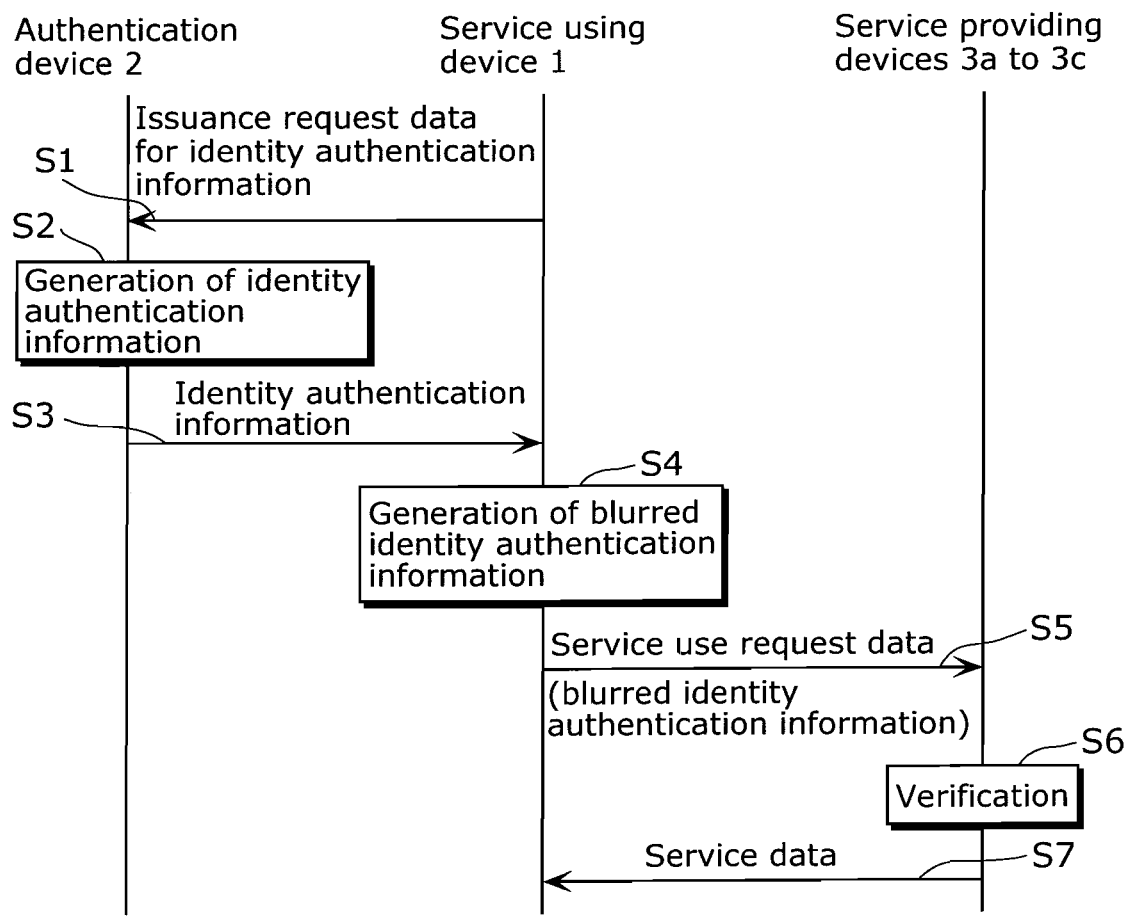
FIG. 3 is a diagram showing a communication sequence in exchanging communication in the authentication system according to the embodiment of the present invention.

FIG. 3 is a diagram showing a communication sequence in exchanging communication in this authentication system.

First, in order to request the authentication device 2 to issue identity authentication information (here, identity certificate), the service using device 1 transmits, to the authentication device 2, issuance request data for identity authentication information (S1).

The authentication device 2, which has received the issuance request data for identity authentication information, generates identity authentication information including a pair of plural pieces of identity information and blurred identity information according to the issuance request data for the identity authentication information (S2), and returns the generated identity authentication information to the service using device 1 (S3).

The service using device 1, which has received the identity authentication information, makes a change in (performs a process of blurring a part of items on) the identity authentication information according to the instruction of the user, generates blurred identity authentication information (here, a blurred identity certificate) obtained by substituting blurred identity information for desired identity information included in the identity authentication information (S4), and transmits, to the service providing devices 3a to 3c, service use request data including the generated blurred identity authentication information (S5).

The service providing devices 3a to 3c having received the service use request data verify the blurred identity information included in the service use request data (S6), and when the devices have confirmed the validity, the service providing devices 3a to 3c provide requested service data to the service use device 1 (S7).

Operations of the service using device 1, the authentication device 2, and the service providing devices 3a to 3c in this authentication system will be described below in each of the procedures of "System Setup", "Identity Certificate Issuance Procedure" (S1 to S3 in FIG. 3), and "Service Use Procedure" (S4 to S7 in FIG. 3).

(System Setup)

The authentication device 2 generates a signature generation key of a digital signature in starting up the authentication system, and secretly holds the key therewithin. Further, a signature verification key for verifying a digital signature generated using the signature generation key is simultaneously generated distributed to the service providing devices 3a to 3c, and held within the devices. Here, as for the digital signature, a digital signature method using a public key encryption method is applied. Since the digital signature method using the public key encryption method is a known technique, the details thereof are not described here.

(Identity Certificate Issuance Procedure)

The "identity certificate issuance procedure" is performed when the service user initially uses this authentication system. With this procedure, the service user obtains an identity certificate needed in using a variety of services. The details of the identity certificate issuance procedure are described below.

FIG. 4 is a block diagram showing an example of a structure of the service using device 1 used for executing the "identity certificate issuance procedure" and the "service use procedure".

Figure 5A:
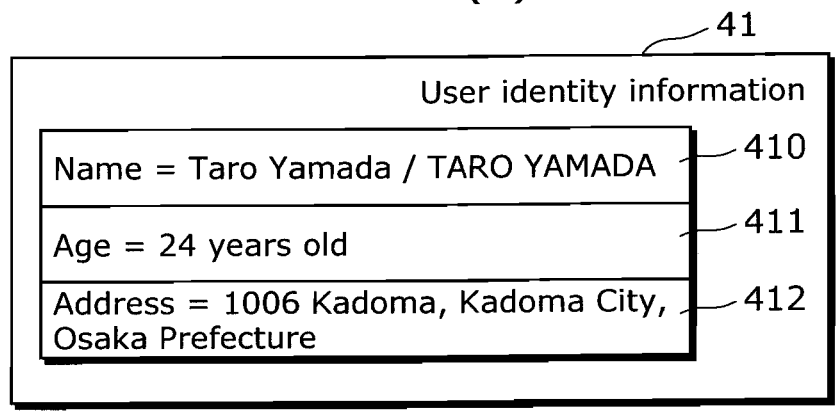
FIGS. 5(*a*) and 5(*b*) each is a view showing an example of a structure of user identity information and information for blurring according to the embodiment of the present invention.

The service using device 1 includes: a user identity information storing unit 10 which is a personal computer or the like used by the service user and stores identity information of the service user (user identity information); an issuance request data for identity authentication information sending unit 11 which generates, from the user identity information, issuance request data of identity authentication information, and sends the data to the authentication device 2; an identity authentication information receiving unit 12 which receives the identity authentication information sent from the authentication device 2; an identity authentication information storing unit 13 which stores the received identity authentication information; an identity authentication information displaying unit 14 which displays the stored identity authentication information in a form visible to the service user; a blurring instruction accepting unit 15 which accepts an instruction concerning a blurring process on the identity authentication information transmitted from the service user; a blurred identity authentication information generating unit 16 which performs the blurring process on the identity authentication information according to an instruction of the service user in order to generate blurred identity authentication information; a service use request data sending unit 17 which adds information requesting the use of a service to the generated blurred identity authentication information, and sends the obtained information to any of the service providing devices 3a to 3c; and a service data receiving unit 18 which receives service data provided from any of the service providing devices 3a to 3c. When the service user instructs the service using device 1 to request the authentication institution to issue identity authentication information of his or her own, the service using device 1 performs the following processes. First, the user identity information storing unit 10 transmits stored user identity information to the issuance request data for the identity authentication information sending unit 11. Here, the user identity information means personal information of the service user. An example of the user identity information is shown in FIG. 5(a). In FIG. 5(a), user identity information 41 is made up of name information 410 representing "Taro Yamada/TARO YAMADA" expressed in Chinese and Roman characters as the name of the service user, age information 411 representing "24 years old" as his age, and address information 412 representing "1006 Kadoma, Kadoma City, Osaka Prefecture" as his address.

Next, the issuance request data for the identity authentication information sending unit 11 adds, to this user identity information, message information requesting issuance of identity authentication information according to the user identity information 41, so as to generate identity issuance request data for authentication information, and sends the generated data to the authentication device 2 (S1 in FIG. 3).

Figure 6:
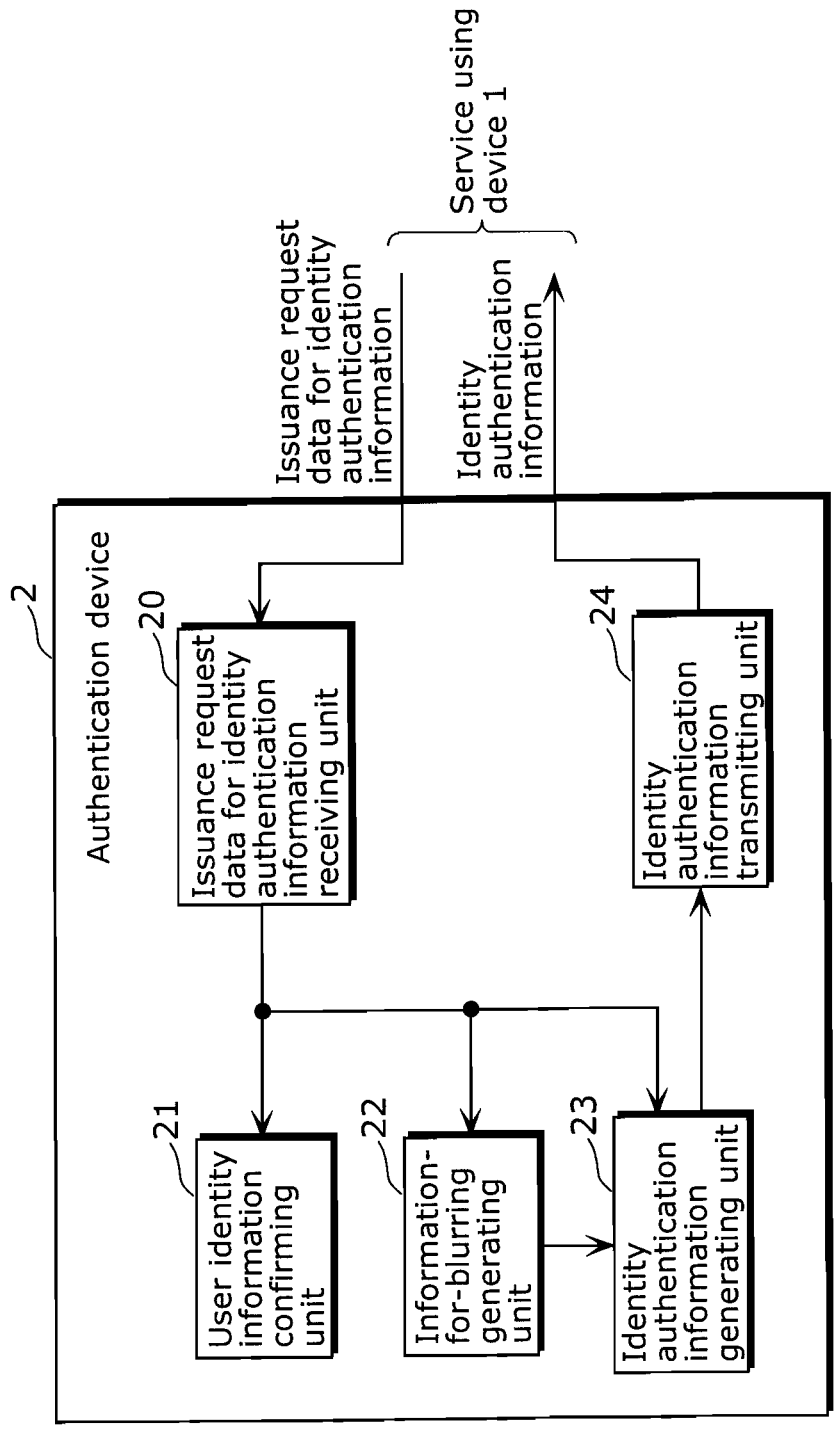
FIG. 6 is a block diagram showing a structure of an authentication device according to the embodiment of the present invention.

A description is given of an operation performed by the authentication device 2 which has received the issuance request data for the identity authentication information. FIG. 6 is a block diagram showing an example of a structure of the authentication device 2. The authentication device 2 is structured with: an issuance request data for identity authentication information receiving unit 20 which receives the issuance request data for identity authentication information sent from the service using device 1; a user identity information confirming unit 21 which confirms that the user identity information 41 included in the issuance request data for the received identity authentication information is correct personal information of the service user; an information-for-blurring generating unit 22 which generates information for blurring which is data with which "blurring" is performed on the user identity information 41; an identity authentication information generating unit 23 which adds a digital signature using the user identity information 41 and the information for blurring, so as to generate identity authentication information; and an identity authentication information transmitting unit 24 which sends the generated identity authentication information to the service using device 1.

Figure 7:
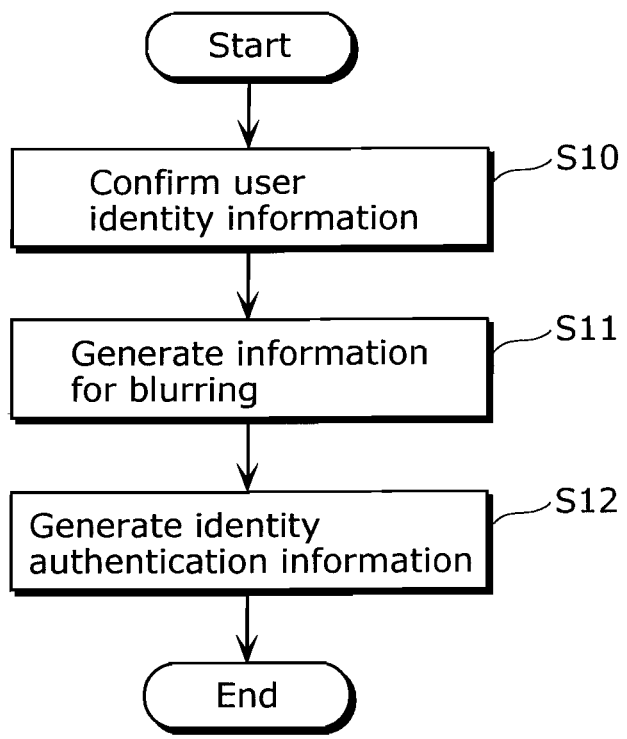
FIG. 7 is a flowchart showing a main operation of the authentication device according to the embodiment of the present invention.

FIG. 7 is a flowchart showing main operations of the authentication device 2 shown in FIG. 6.

The issuance request data for identity authentication information receiving unit 20 receives issuance request data for identity authentication information, and transmits the user identity information 41 included in the issuance request data for the identity authentication information to the user identity information confirming unit 21, the information-for-blurring generating unit 22, and the identity authentication information generating unit 23. The user identity information confirming unit 21 confirms that the user identity information 41 transmitted from the issuance request data for identity authentication information receiving unit 20 is correct (S10 in FIG. 7). For example, a method for the confirmation is performed in a way that the authentication device 2 is connected via the network with a resident card database held in a public institution such as a city hall, and it can confirm the correctness of the user identity information 41 by consulting the resident card database. Only when it is confirmed that the user identity information 41 is correct, the following processes are performed. When it is found that the user identity information 41 is invalid, the following processes are not performed and the process is finished.

Figure 5B:
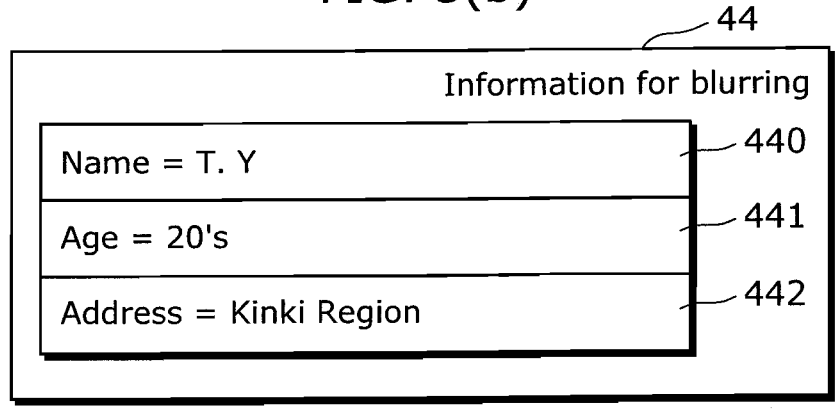

The information-for-blurring generating unit 22 generates information for blurring with respect to the name information 410, the age information 411, and the address information 412, which are included in the user identity information 41 received from the service using device 1 (S11 in FIG. 7) in the following manner. FIG. 5(b) shows an example of information for blurring. First, as for the name information 410, the first Roman character is taken out from each of a family name and a last name to generate initials as blurred name information 440. In the example shown in FIG. 5(b), the initial "T" of the last name and the initial "Y" of the family name are taken out from the name "TARO YAMADA" expressed in Roman characters, to obtain "T. Y" which is the blurred name information 440.

As for the age information 411, an age range which is obtained by changing the ones place of an age to zero is given as the blurred age information 441. In the example of FIG. 5(a), the ones place "4" of the age "24 years old" is changed to "0", and the age range expressed as "20's" is given as the blurred age information 441.

Figure 8:
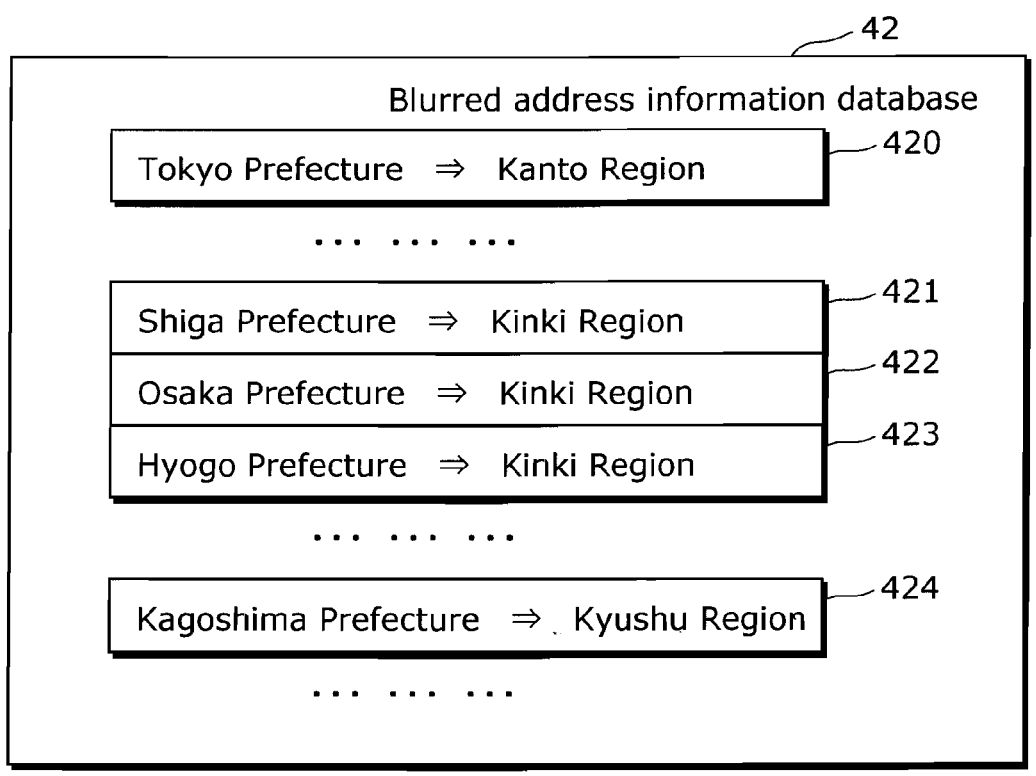
FIG. 8 is a block diagram showing a structure of a blurred address information database according to the embodiment of the present invention.

As for the address information 412, blurred address information 442 is generated according to a blurred address information database which is previously held inside the information-for-blurring generating unit 22. FIG. 8 shows an example of the blurred address information database 42 held inside the information-for-blurring generating unit 22. The blurred address information database 42 is made up of blurred address information rules 420 to 424, and for example, the blurred address information rule 420 shows that address information "Tokyo Prefecture" is converted into blurred address information "Kanto Region". In the example shown in FIG. 5(a), "Osaka Prefecture" representing a prefecture is extracted from address information 432 "1006 Kadoma, Kadoma City, Osaka Prefecture", and the blurred address rule 422 is applied to the extracted information so as to obtain "Kinki Region" as the blurred address information 442. Information for blurring 44, which are made up of the blurred name information 440, the blurred age information 441, and the blurred address information 442 generated as thus described is generated and transferred to the identity authentication information generating unit 23.

The identity authentication information generating unit 23 generates identity authentication information based on the user identity information 41 transmitted from the issuance request data for the identity authentication information receiving unit 20 and the information for 44 blurring transmitted from the information-for-blurring generating unit 22 (S12 in FIG. 7).

Figure 9:
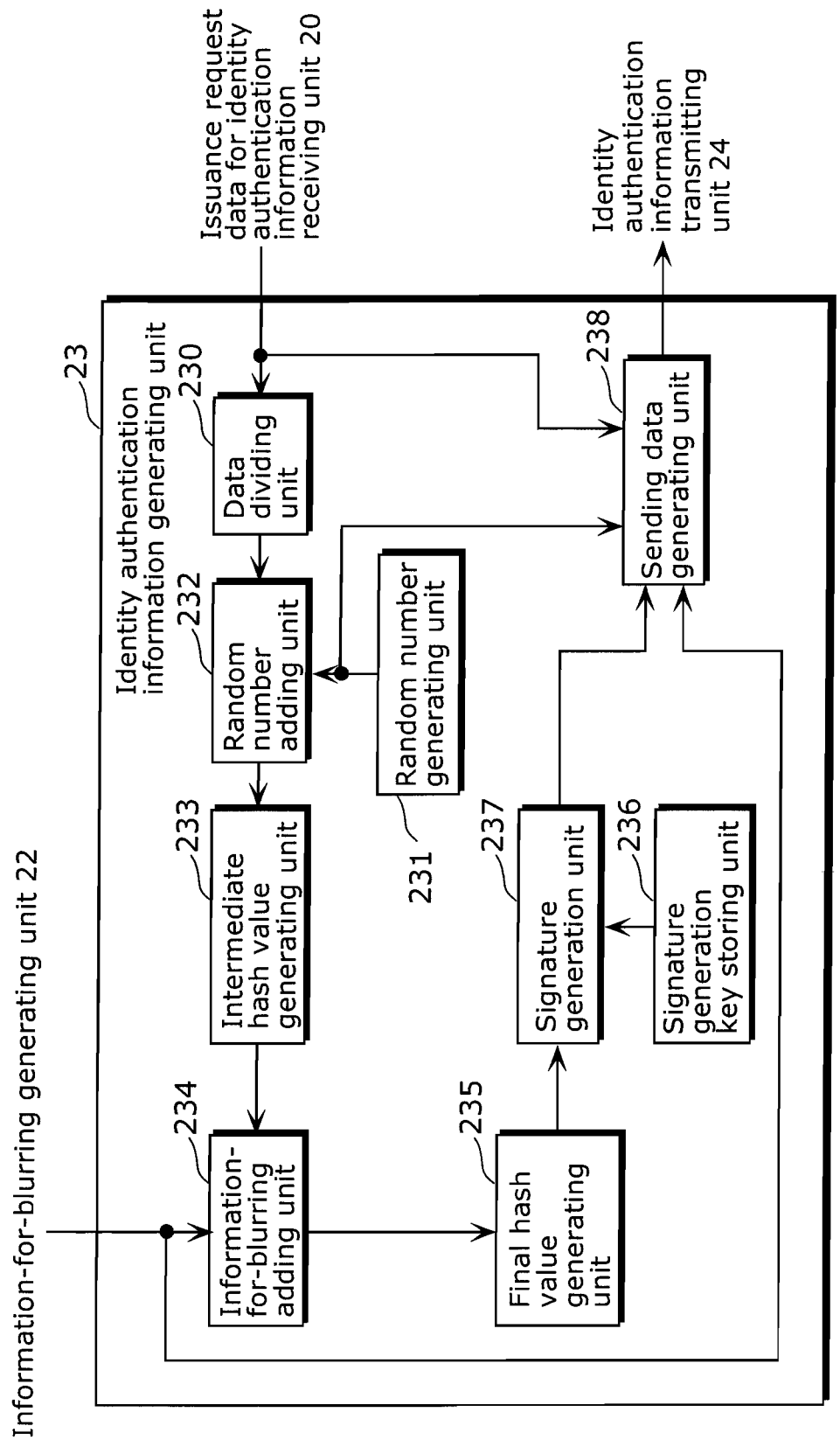
FIG. 9 is a block diagram showing a structure of an identity authentication information generating unit according to the embodiment of the present invention.

FIG. 9 is a block diagram showing an example of the structure of the identity authentication information generating unit 23. The identity authentication information generating unit 23 is structured with: a data dividing unit 230 which divides the user identity information 41 transmitted from the issuance request data for the identity authentication information receiving unit 20; a random number generating unit 231 which generates a random number; a random number adding unit 232 which adds a random number to each piece of the user identity information 41 divided in the data dividing unit 230; an intermediate hash value generating unit 233 which performs hash calculation to generate an intermediate hash value; an information-for-blurring adding unit 234 which adds, to the generated intermediate hash value, the information for blurring 44 transmitted from the information-for-blurring generating unit 22; a final hash value generating unit 235 which performs hash calculation on the information obtained in the information-for-blurring adding unit 234 to generate a final hash value; a signature generation key storing unit 236 which stores a signature generation key for generating a digital signature; a signature generation unit 237 which generates a digital signature with respect to the final hash value obtained in the final hash value generating unit 235; and a sending data generating unit 238 which generates identity authentication information to be sent to the service using device 1 based on the user identity information 41 divided in the data dividing unit 230, a random number generated by the random number generating unit 231, a digital signature generated in the signature generation unit 237, and the information for blurring 44 transmitted from the information-for-blurring generating unit 22. An operation of the identity authentication information generating unit 23 (S2 in FIG. 3) is described below.

The data dividing unit 230 divides the user identity information 41 to be inputted and transfers the divided information to the random number adding unit 232 and the sending data generating unit 238. Specifically, in the FIG. 5(a), the user identity information 41 is divided into three data of the name information 410, the age information 411, and the address information 412, and transmitted to the random number adding unit 232 and the sending data generating unit 238.

Next, the random number generating unit 231 generates three random numbers r1, r2, and r3, and transmits those random numbers to the random number adding unit 232 and the sending data generating unit 238. Here, the number of generated random numbers is equivalent to the number of pieces of divided data generated in the data dividing unit 230.

Next, the random number adding unit 232 converts the name information 410, the age information 411, and the address information 412 into numeric value data m1, m2, and m3 according to a prescribed rule. Conversion from an ASCII code to a numeric value or the like may be applied as the prescribed rule. The random numbers r1, r2, and r3 generated in the random number generating unit 231 are then coupled to the obtained numeric value data m1, m2, and m3 respectively to obtain m1∥r1, m2∥r2, m3∥r3, and the m1∥r1, m2∥r2, m3∥r3 are transmitted to the intermediate hash value generating unit 233. Here, "∥" represents data coupling (for example, digit linking).

Next, the intermediate hash value generating unit 233 performs the following calculation on the data m1∥r1, m2∥r2, m3∥r3 transmitted from the random number adding unit 232, to generate intermediate hash values i1, i2, and i3, and transmits those values to the information-for-blurring adding unit 234.

$$i1 = \text{Hash}(m1\|r1)$$

$$i2 = \text{Hash}(m2\|r2)$$

$$i3 = \text{Hash}(m3\|r3)$$

Here, Y=Hash(X) means that prescribed hash calculation Hash is performed on data X, and the result of the calculation is Y. As a hash algorithm Hash used here, any of known hash method is applicable, and for example, SHA-1 method may be used.

Next, the information-for-blurring adding unit 234 divides the information for blurring 44 transmitted from the information-for-blurring generating unit 22 into three data of the blurred name information 440, the blurred age information 441, and the blurred address information 442, and further converts the respective data into numeric value data b1, b2, and b3 according to a prescribed rule. As the prescribed rule used here, conversion from an ASCII code to a numeric value or the like may also be applied. The numeric value data b1, b2, and b3 as thus generated are coupled to the respective intermediate hash values i1, i2, and i3 to generate coupling data i1∥b1, i2∥b2, i3∥b3 which are then transmitted to the final hash value generating unit 235.

Next, the final hash value generating unit 235 performs the following hash calculation on the data i1∥b1, i2∥b2, i3∥b3 transferred from the information-for-blurring adding unit 234 to generate final hash values h1, h2, and h3, and then transfers the values to the signature generation unit 237.

$$h1 = \text{Hash}(i1\|b1)$$

$$h2 = \text{Hash}(i2\|b2)$$

$$h3 = \text{Hash}(i3\|b3)$$

The signature generation key storing unit 236 stores a signature generation key generated at the time of starting up the authentication system. After the process performed by the final hash value generating unit 235, the signature generation key storing unit 236 transmits the signature generation key stored therein to the signature generation unit 237.

Next, the signature generation unit 237 uses the signature generation key transmitted from the signature generation key storing unit 236, to generate a digital signature based on the final hash values h1, h2, and h3. Specifically, a digital signature S is generated by the following calculation.

$$S = \text{Sig}(Ks, h1\|h2\|h3)$$

Here, Ks denotes a signature generation key, and S=Sig(K, D) represents that the digital signature S is generated based on data D using a signature generation key K. Note that, since the method for generating a digital signature is known, the details thereof are not described here. The digital signature S generated as thus described is transmitted to the sending data generating unit 238.

Figure 10:
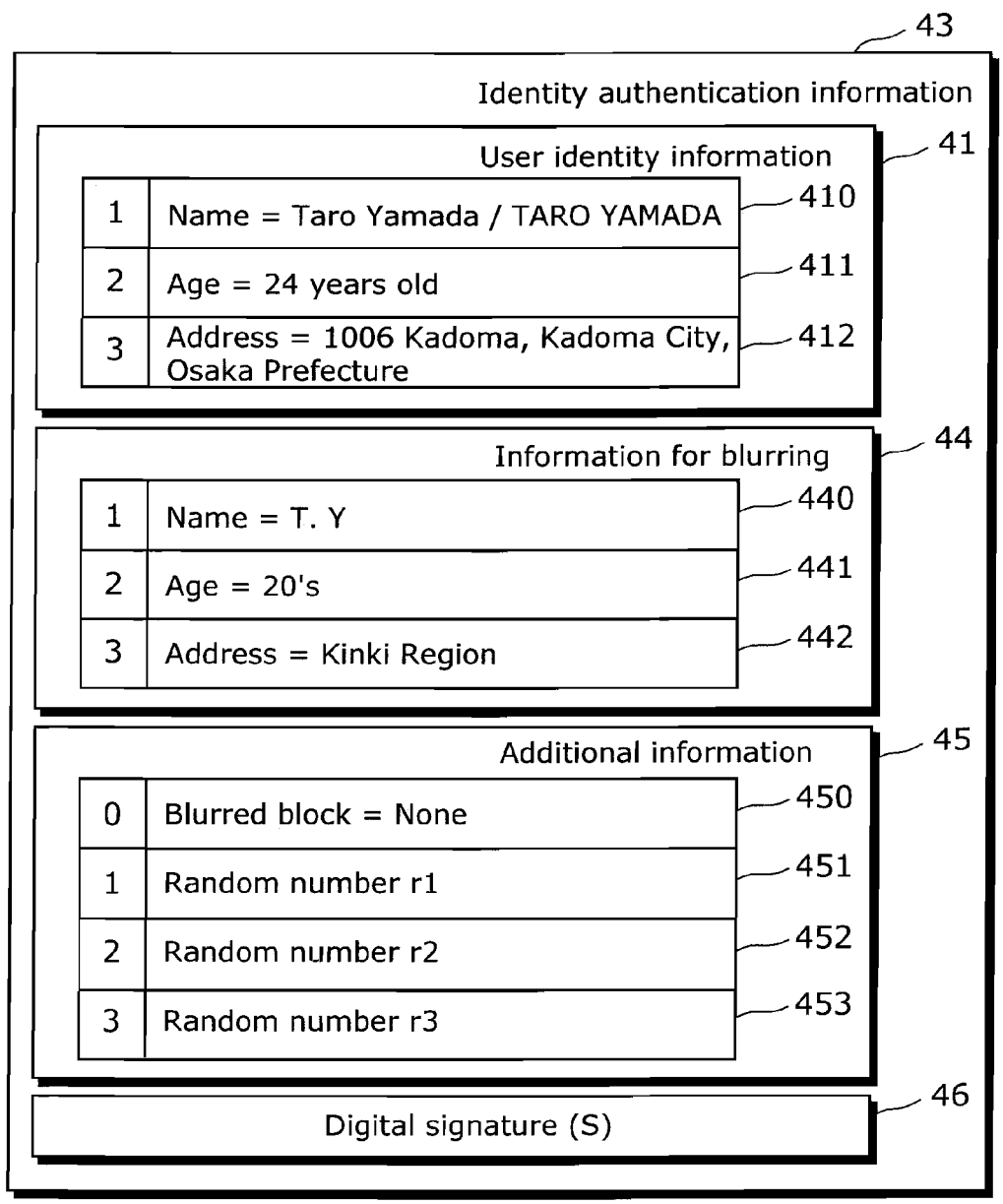
FIG. 10 is a diagram showing an example of a structure of divided identity authentication information according to the embodiment of the present invention.

Next, the sending data generating unit 238 generates identity authentication information 43 as shown in FIG. 10 based on the user identity information 41, the random numbers r1, r2, and r3, the information for blurring 44, and the digital signature S. Here, "1", "2", and "3" are respectively added as index values to the name information 410, the age information 411, and the address information 412 which are included in the user identity information 41. "1", "2", and "3" are also respectively added as index information to the blurred name information 440, the blurred age information 441, and the blurred address information 442 which are included in the information for blurring 44. Further, the identity authentication information 43 includes additional information 45 made up of: blurred block information 450; a random number r1 (451); a random number r2 (452); and a random number r3 (453), and includes a digital signature S (46). "0", "1", "2", and "3" are respectively added as index values to the blurred block information 450 and the random numbers r1 to r3 (451 to 453). Here, the blurred block information 450 is represented as an index value indicating which piece of identity information is "blurred" among the identity authentication information 43. Note that, since there is no identity information to be "blurred" at the time point when the authentication device 2 has generated the identity authentication information 43, data representing "none" is set as the blurred block information 450 (As described later, the blurred block information 450 is set in the service using device 1.) As thus described, the sending data generating unit 238 generates the identity authentication information 43, and transmits the information to the identity authentication information transmitting unit 24. The identity authentication information transmitting unit 24 then sends the identity authentication information 43 to the service using device 1.

The service using device 1 receives in the identity authentication information receiving unit 12 the identity authentication information 43 (S3 in FIG. 3) sent from the authentication device 2, as shown in FIG. 4. The identity authentication information receiving unit 12 transmits the received identity authentication information 43 to the identity authentication information storing unit 13. The identity authentication information storing unit 13 then stores the identity authentication information 43.

(Service Use Procedure)

The "service use procedure" is executed at the time when the service user uses the service using device 1 to use a service provided by a service provider using the service providing devices 3a to 3c. Before executing the service use procedure, the service using device 1 needs to execute the foregoing "identity certificate issuance procedure" and receive identity authentication information 43 issued from the authentication device 2. FIG. 2 shows a case where service providers A, B, and C respectively provide the three services A, B, and C within the authentication system. At this time, in order to provide a service, the service provider A uses the service providing device 3a, the service provider B uses the service providing device 3b, and the service provider C uses the service providing device 3c. The service user selects one service desired to be used among the above services and uses the service using device 1, to be provided with the service from the service providing device corresponding to the service. The following description is given of the service use procedure taken in a case where the service provider uses the service A, but the same procedure applies to the case of using the services B or C.

First, the service using device 1 having received an instruction to use the service A from the service user transmits, to the identity authentication information displaying unit 14, in the identity authentication information storing unit 13 shown in FIG. 4 the identity authentication information 43 stored therein.

Next, the identity authentication information displaying unit 14 displays the name information 410, the age information 411, and the address information 412 among the information included in the transmitted identity authentication information 43, and displays a message asking the service user about which piece of information is to be "blurred" among the displayed user identity information. The service user having confirmed the contents of the display inputs, into the service using device 1, data instructing which piece of information is to be "blurred" among the three pieces of information, and the service using device 1 accepts the instruction in the blurring instruction accepting unit 15. At this time, "blurring" one or plural pieces of information may be instructed, or not "blurring" any piece of information may be instructed. The following description is given of a case where the service user makes an instruction to "blur" the name information 410 and the address information 412. Note that as for which piece of information is to be "blurred" among user identity information, there is a case where the service user can make an instruction completely freely, or there is also a case where the service user makes an instruction under constraints previously determined depending on a service to be used. For example, in the case of a service requiring correct age information of the user, a condition for using the service is not to "blur" the age information, and hence the service user cannot make an instruction to "blur" the age information. The blurring instruction accepting unit 15 having received the "blurring" instruction transmits the blurring instruction to the blurred identity authentication information generating unit 16.

Next, the blurred identity authentication information generating unit 16 generates blurred identity authentication information based on the identity authentication information 43 inputted from the identity authentication information storing unit 13 and the blurring instruction transmitted from the blurring instruction accepting unit 15 (S4 in FIG. 3). The details of that process are described below.

Figure 11:
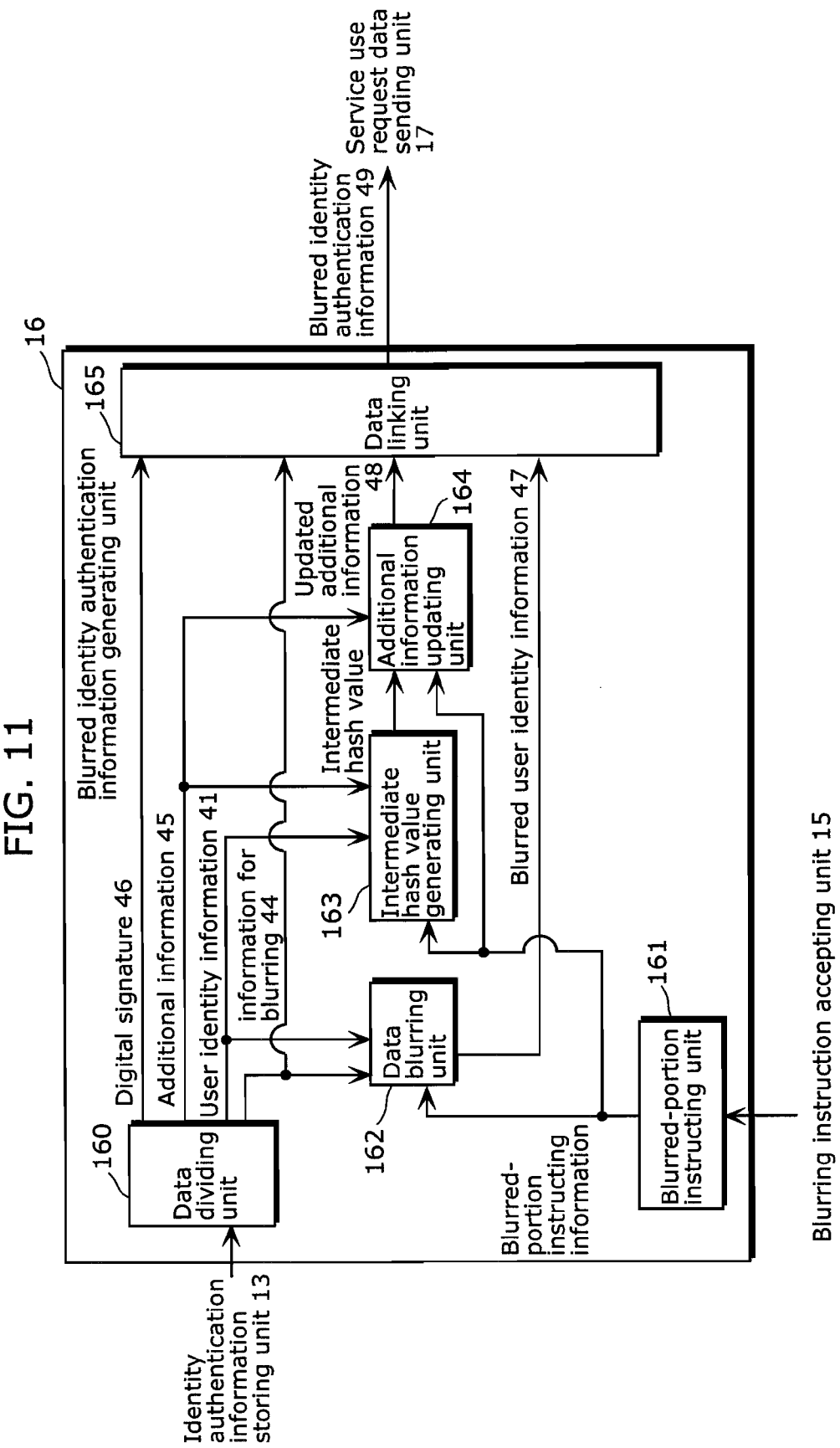
FIG. 11 is a block diagram showing a structure of a blurred identity authentication information generating unit according to the embodiment of the present invention.

FIG. 11 is a block diagram showing an example of a structure of the blurred identity authentication information generating unit 16. The blurred identity authentication information generating unit 16 is structured with a data dividing unit 160 which divides the identity authentication information 43 transferred from the identity authentication information storing unit 13 into plural data (the user identity information 41, the information for blurring 44, the additional information 45, and digital signature 46); a blurred-portion instructing unit 161 which transfers blurred-portion instructing information representing an instruction from the blurring instruction accepting unit 15, to an intermediate hash value generating unit 163 and an additional information updating unit 164; data blurring unit 162 which perform the blurring process on the user identity information 41 using the information for blurring 44 according to the blurred-portion instructing information from the blurred-portion instructing unit 161, so as to generate blurred user identity information 47; an intermediate hash value generating unit 163 which performs hash calculation on the user identity information 41 according to the blurred-portion instructing information from the blurred-portion instructing unit 161 and the additional information 45, to obtain an intermediate hash value; an additional information updating unit 164 which updates the additional information 45 with the intermediate hash value from the intermediate hash value generating unit 163, according to the blurred-portion instructing information from the blurred-portion instructing unit 161, so as to generate updated additional information 48; and a data linking unit 165 which links the digital signature 46, the information for blurring 44, the updated additional information 48, and the blurred user identity information 47, so as to generate blurred identity authentication information.

Operations of the blurred identity authentication information generating unit 16 when the identity authentication information 43 and a blurring instruction is inputted thereinto are described below with reference to a flowchart showing main operations shown in FIG. 12.

First, the data dividing unit 160 accepts the identity authentication information 43 transferred from the identity authentication information storing unit 13 and divides the information into plural data. Specifically, the information is divided into the following four as shown in FIG. 10: the user identity information 41, the information for blurring 44, the additional information 45, and the digital signature 46. Then, the data dividing unit 160 transfers the user identity information 41 to the data blurring unit 162 and the intermediate hash value generating unit 163, transfers the information for blurring 44 to the data blurring unit 162 and the data linking unit 165, transfers the additional information 45 to the intermediate hash value generating unit 163 and the additional information updating unit 164, and transfers the digital signature 46 to the data linking unit 165.

Next, the blurred-portion instructing unit 161 accepts the blurring instruction, and transfers the instruction to the data blurring unit 162, the intermediate hash value generating unit 163, and the additional information updating unit 164. Specifically, the blurred-portion instructing information shows that the blurring process is performed on name information and address information, and is, for example, information made up of "1" and "3" which are index values of the name information and the address information, respectively.

Figure 12:
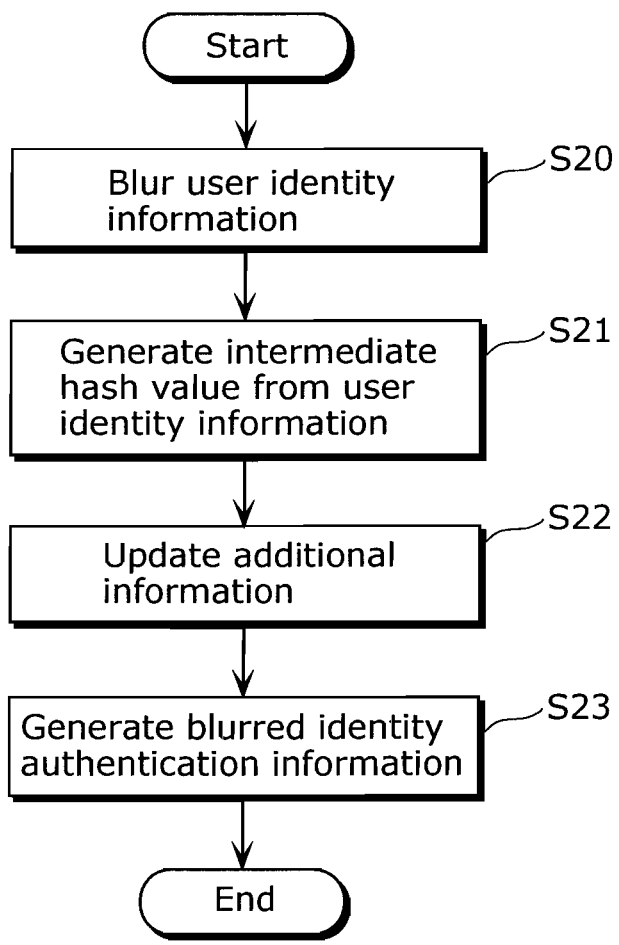
FIG. 12 is a flowchart showing an operation of the blurred identity authentication information generating unit according to the embodiment of the present invention.
Figure 13:
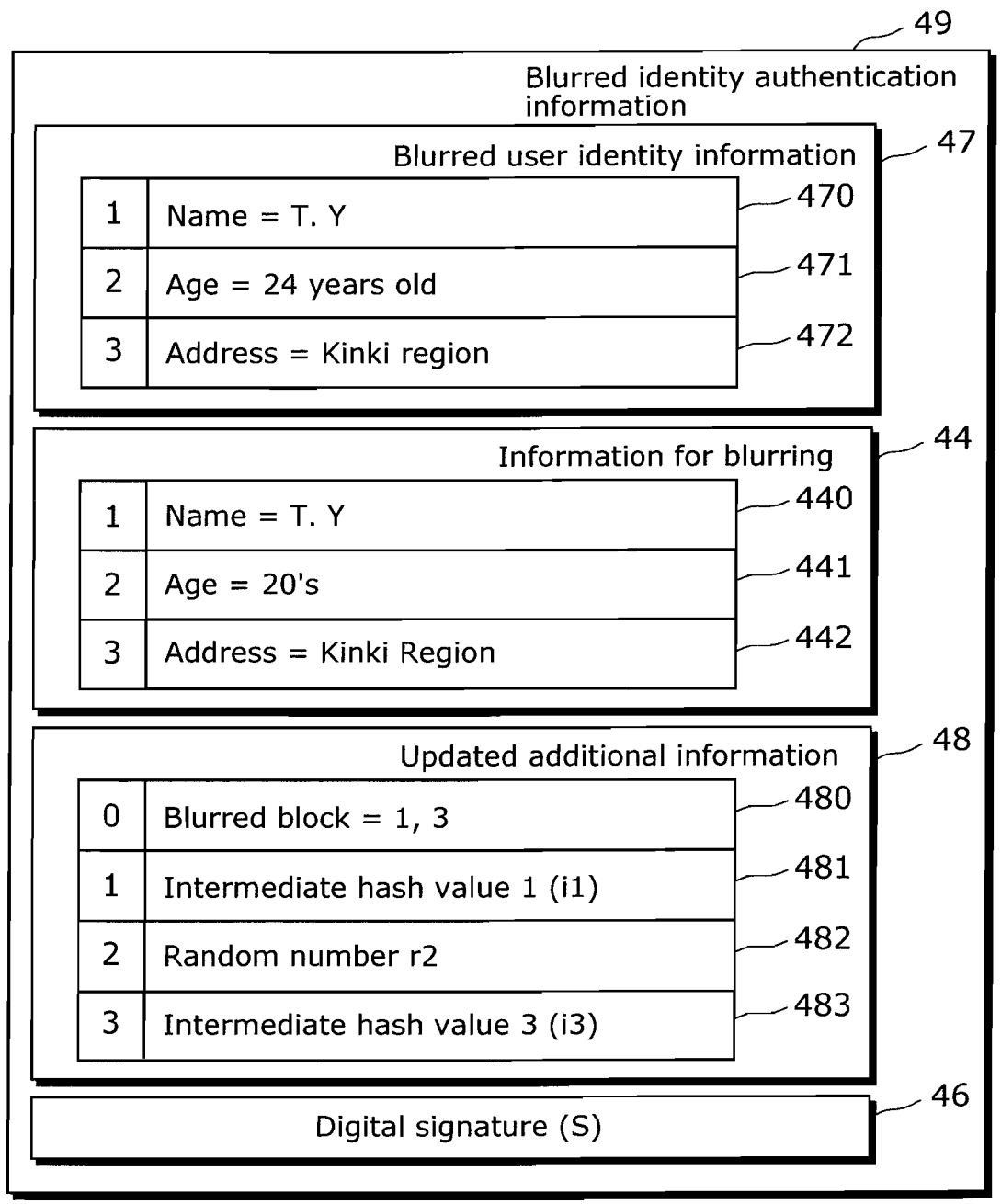
FIG. 13 is a diagram showing an example of a structure of update adding information according to the embodiment of the present invention.

Next, the data blurring unit 162 "blurs" the user identity information 41 transferred from the data dividing unit 160 using the information for blurring 44 in accordance with the blurred-portion instructing information transferred from the blurred-portion instructing unit 161, so as to generate blurred user identity information (S20 in FIG. 12). Specifically, the data blurring unit 162 substitutes the blurred name information 440 in the information for blurring 44 for the name information 410 in the user identity information 41 in accordance with the blurred-portion instructing information "blurring name information and address information", and simultaneously substitutes the blurred address information 442 in the information for blurring 44 for the address information 412 in the user identity information 41. In this manner, the blurred user identity information 47 is generated as shown in FIG. 13. Here, the name "Taro Yamada/TARO YAMADA" is blurred to initials "T. Y", and the address "1006 Kadoma, Kadoma City, Osaka Prefecture" is blurred to "Kinki Region". The data blurring unit 162 then transfers the blurred user identity information 47 as thus obtained to the data linking unit 165.

Next, the intermediate hash value generating unit 163 calculates an intermediate hash value based on the user identity information 41 transferred from the data dividing unit 160 and the additional information 45 in accordance with the blurred-portion instructing information transferred from the blurred-portion instructing unit 161 (S21 in FIG. 12). Specifically, first, the intermediate hash value generating unit 163 takes out information of the index values "1" and "3" (namely, the name information 410 and the address information 412) from the user identity information 41 according to the blurred-portion instructing information "performing a blurring process on name information (index value "1") and address information (index value "3"), and converts the taken-out information into numeric value data m1 and m3 according to the foregoing conversion rule. Further, it takes out information of the index values "1" and "3" (namely, random numbers r1 and r3) also from the additional information 45, so as to generate intermediate hash values i1 and i3 using the following calculation. It transfers the generated intermediate hash value i1 and i3 to the additional information updating unit 164.

$$i1 = \text{Hash}(m1 \| r1)$$

$$i3 = \text{Hash}(m3 \| r3)$$

Next, the additional information updating unit 164 updates the additional information 45 transferred from the data dividing unit 160 using the intermediate hash values i1 and i3 in accordance with the blurred-portion instructing information transferred from the blurred-portion instructing unit 161 (S22 in FIG. 12). Specifically, the additional information updating unit 164 updates the additional information by substituting the intermediate hash values i1 and i3 for the information of the index values "1" and "3" (namely, the name information 410 and the address information 412) among the additional information 45 according to the blurred-portion instructing information "performing a blurring process on name information (index value "1") and address information (index value "3")". Further, "1" and "3" are stored in a data region of an index value "0" displaying a blurring block. This represents an index value of a field for which the intermediate hash value is substituted. FIG. 13 shows the updated additional information 48 obtained by updating the additional information 45 by the additional information updating unit 164 as thus described. As shown in this figure, the updated additional information 48 is made up of blurred block information 480, an intermediate hash value i1 (481), a random number r2 (482), and an intermediate hash value i3 (483). The additional information updating unit 164 transfers the updated additional information 48 obtained as a result of the update to the data linking unit 165.

Next, the data linking unit 165 couples the blurred user identity information 47 transferred from the data blurring unit 162, the information for blurring 44 and the digital signature 46 transferred from the data dividing unit 160, and the updated additional information 48 transferred from the additional information updating unit 164, so as to generate blurred identity authentication information (S23 in FIG. 12). FIG. 13 shows blurred identity authentication information 49. The blurred identity authentication information 49 as thus generated is transferred to the service use request data sending unit 17, and the process of the blurred identity authentication information generating unit 16 is completed.

Finally, as shown in FIG. 4, the service use request data sending unit 17 sends, to the service providing device 3a, service use request data obtained by adding a message for requesting use of the service A to the blurred identity authentication information 49 generated in the blurred identity authentication information 49 (S5 in FIG. 3).

Figure 14:
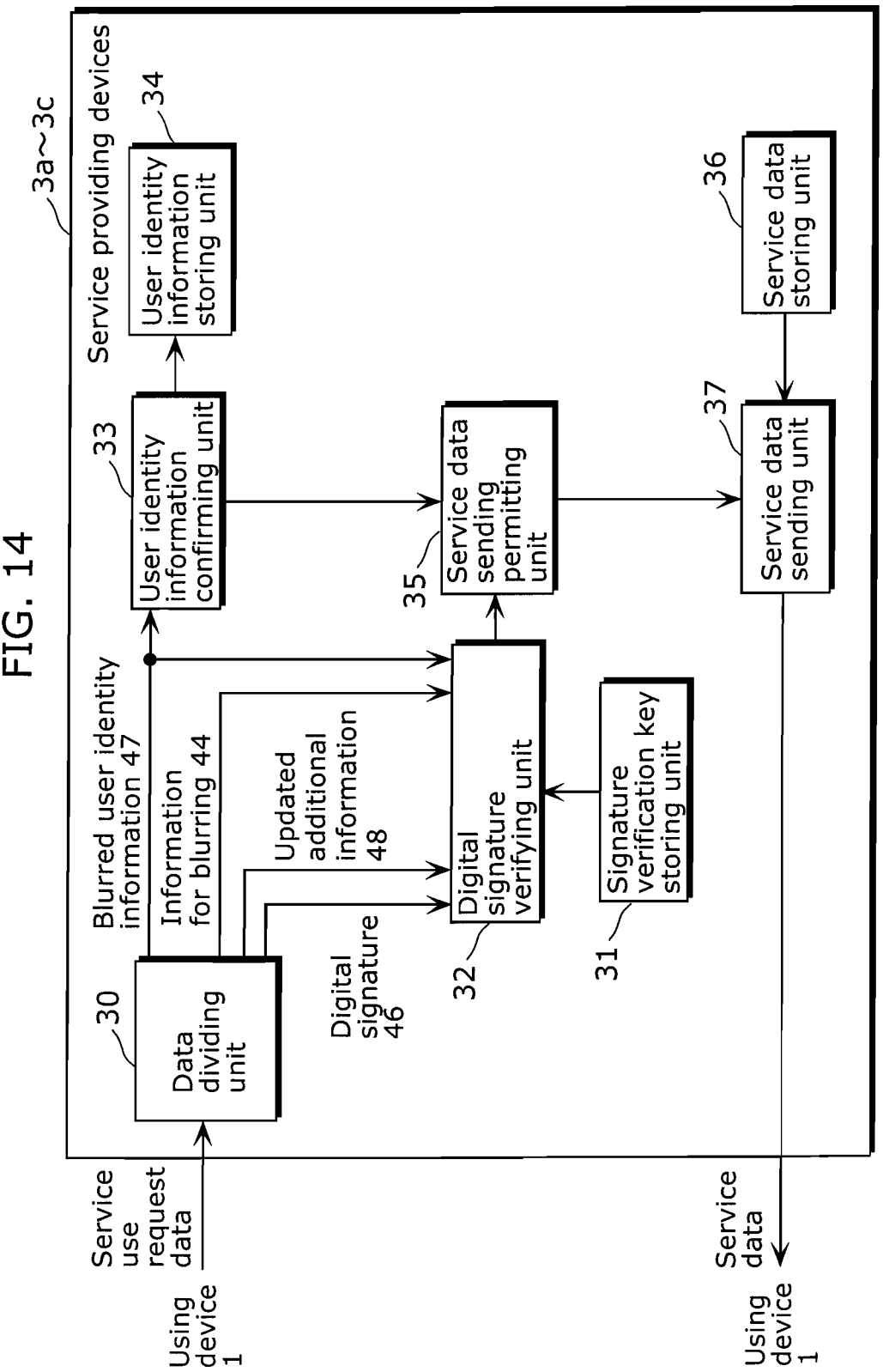
FIG. 14 is a block diagram showing a structure of a service providing device according to the embodiment of the present invention.

Next, an internal operation of the service providing device 3a (3b, 3c) after receiving the service use request data is described. FIG. 14 is a block diagram showing an example of a structure of the service providing device 3a (3b, 3c). The service providing device 3a (3b, 3c) is structured with: a data dividing unit 30 which takes out the blurred identity authentication information 49 from the service use request data received from the service using device 1, and then divides the information; a signature verification key storing unit 31 which stores a signature verification key for verifying a digital signature; a digital signature verifying unit 32 which verifies the digital signature using the signature verification key; a user identity information confirming unit 33 which confirms the user identity information; a user identity information storing unit 34 which stores the user identity information; a service data sending permitting unit 35 which permits service data to be sent to the service user on the basis of a verification result of the digital signature and a result of confirmation of the user identity information; a service data storing unit 36 which stores service data to be sent to the service user; and a service data sending unit 37 which sends the service data to the service user. Operations of the service providing device 3a (3b, 3c) are described in detail below.

First, the data dividing unit 30 takes out the blurred identity authentication information 49 included in the service use request data received from the service using device 1 and further divides the blurred identity authentication information 49 into the blurred user identity information 47, the information for blurring 44, the updated additional information 48 and the digital signature 46. The data dividing unit 30 then transfers the blurred user identity information 47 to the user identity information confirming unit 33 and the digital signature verifying unit 32, and transfers, to the digital signature verifying unit 32, the information for blurring 44, the updated additional information 48, and the digital signature 46.

Next, the signature verification key storing unit 31 transfers the stored signature verification key to the digital signature verifying unit 32.

Subsequently, the digital signature verifying unit 32 verifies the digital signature 46 using the signature verification key transferred from the signature verification key storing unit 31 based on the blurred user identity information 47, the information for blurring 44, and the updated additional information 48 (S6 in FIG. 3). The details of the verification are described below.

Figure 15:
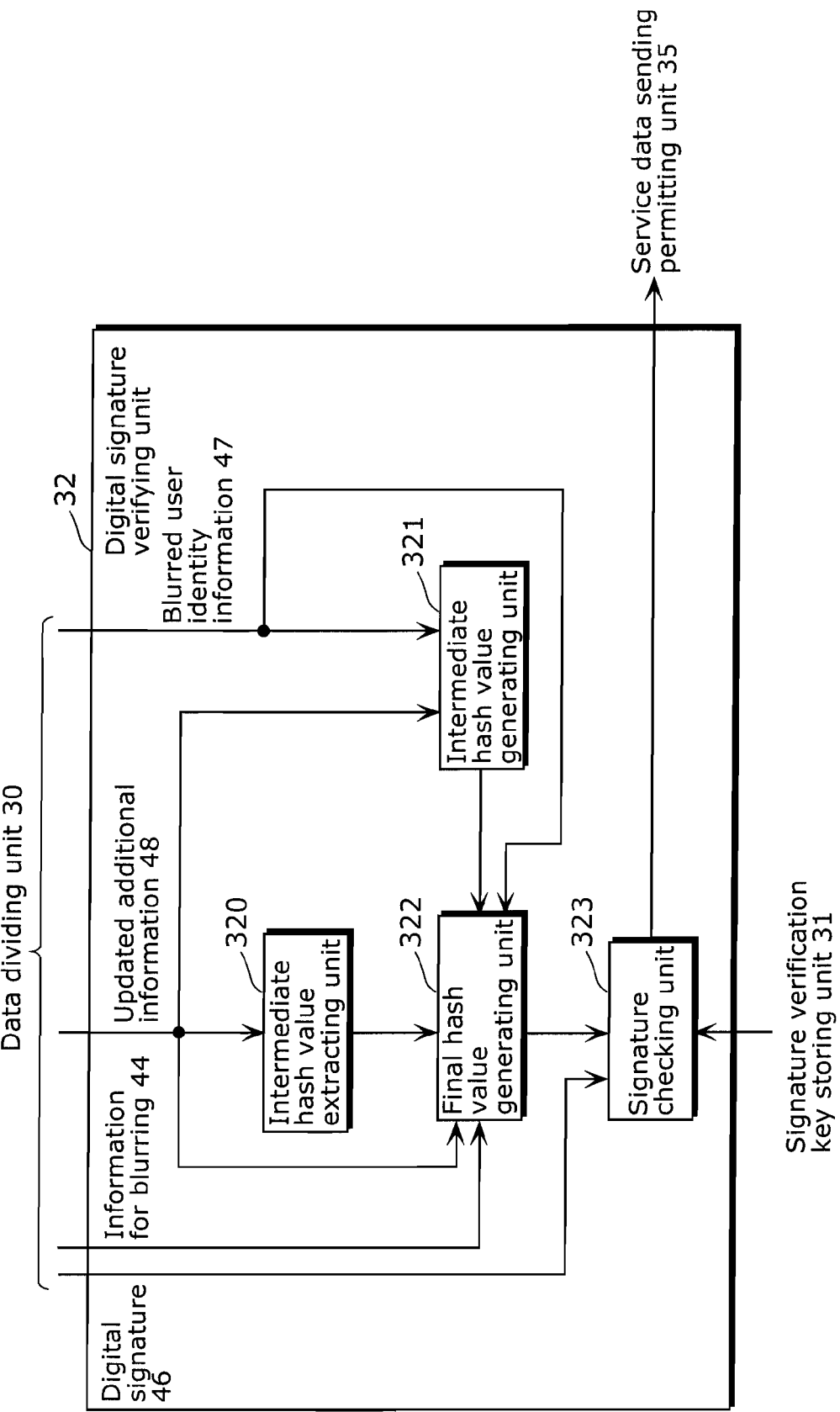
FIG. 15 is a block diagrams showing a structure of a digital signature verifying unit according to the embodiment of the present invention.

FIG. 15 is a block diagram showing an example of an internal structure of the digital signature verifying unit 32. The digital signature verifying unit 32 is structured with: an intermediate hash value extracting unit 320 which takes out an intermediate hash value and a random number from the updated additional information 48; an intermediate hash value generating unit 321 which calculates an intermediate hash value from the blurred user identity information 47 and the random number; a final hash value generating unit 322 which calculates a final hash value from the intermediate hash value, the blurred user identity information 47, the information for blurring 44 and the updated additional information 48; and a signature checking unit 323 which verifies the validity of the final hash value and the digital signature 46 using the signature verification key.

Figure 16:
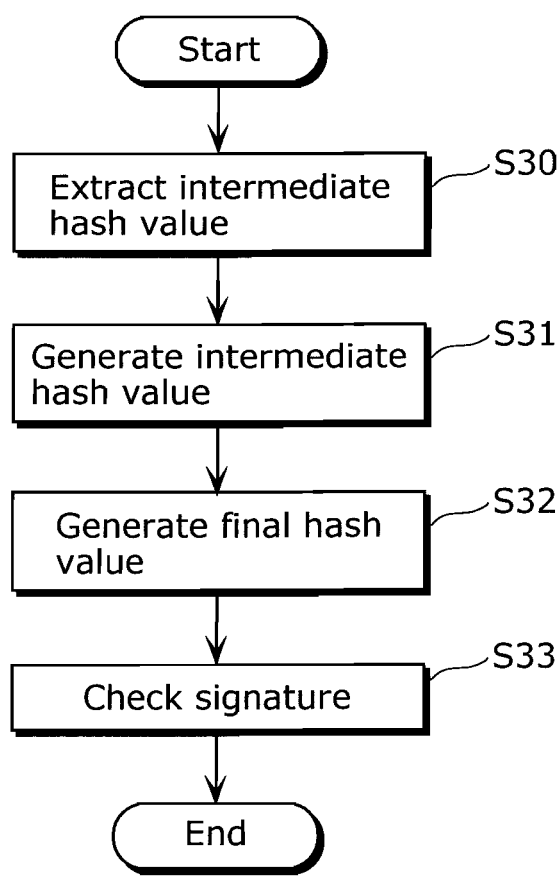
FIG. 16 is a flowchart showing an operational procedure of the digital signature verifying unit according to the embodiment of the present invention.

Internal operations of the digital signature verifying unit 32 are described in detail with reference to FIG. 16 showing the main operation flow.

First, the intermediate hash value extracting unit 320 finds out that the blocks 1 and 3 have been subjected to the blurring process with reference to the blurred block information 480 in the updated additional information 48. The intermediate hash values i1 (481) and i3 (483) are then taken out from the region with the index values 1 and 3, and transferred to the final hash value generating unit 322 (S30 in FIG. 16).

Next, the intermediate hash value generating unit 321 finds out that the block 2 has not been subjected to the blurring process with reference to the blurred block information 480 in the updated additional information 48. The random number r2 (482) is then read out from the region with the index value being 2. Further, the age information 471 of the index value being 2 is obtained from the blurred user identity information 47, and then converted into the numeric value data m2 according to the prescribed conversion rule. The intermediate hash value i2 is calculated according to the following expression, and then transferred to the final hash value generating unit 322 (S31 in FIG. 16).

$$i2=\text{Hash}(m2\|r2)$$

Next, the final hash value generating unit 322 finds out that the blocks 1 and 3 have been subjected to the blurring process with reference to the blurred block information 480 in the updated additional information 48. The final hash value generating unit 322 then receives the intermediate hash values i1 (481) and i3 (483) from the intermediate hash value extracting unit 320. Meanwhile, it obtains the blurred name information 470 and the blurred address information 472 from the region with the index values 1 and 3 of the blurred user identity information 47, and converts the respective pieces of information into numeric values b1 and b3 according to the prescribed conversion rule. Moreover, it obtains the blurred age information 441 from the region with the index value 2 of the information for blurring 44 (block having not been subjected to the blurring process) and converts it into the numeric value b2 in accordance with the prescribed conversion rule. Furthermore, it receives the intermediate hash value i2 from the intermediate hash value generating unit 321.

The final hash value generating unit 322 generates the final hash values h1, h2, and h3 by using i1, i3, b1, b2, b3, and i2, as thus obtained in the following expression, and transfers the values to the signature checking unit 323 (S32 in FIG. 16).

$$h1=\text{Hash}(i1\|b1)$$

$$h2=\text{Hash}(i2\|b2)$$

$$h3=\text{Hash}(i3\|b3)$$

Next, the signature checking unit 323 checks the validity of the final hash values h1, h2, and h3 and the digital signature S using a signature verification key Kp in the following manner, and transfers the result of the verification Result to the service data sending permitting unit 35 shown in FIG. 14 (S33 in FIG. 16).

$$\text{Result}=\text{Verify}(Kp,\ h1\|h2\|h3,\ S)$$

Here, "Result=Verify(Kp, d, S)" means that whether the digital signature S is a valid digital signature of data d is verified using the verification key Kp, and the result of the verification (OK or NG) is shown as Result.

After the process performed by the digital signature verifying unit 32, the user identity information confirming unit 33 confirms the contents of the blurred user identity information 47. Specifically, for example, in the case of a service exclusively for those equal to or older than 20 years old, the user identity information confirming unit 33 checks the age information 471 to confirm that the age is equal to or older than 20 years old. When no problem is found out as a result of the check, it transfers the blurred user identity information 47 to the user identity information storing unit 34. When a problem is found out, the subsequent processes are not performed, and it notifies the service user of a refusal to provide the service.

Next, the user identity information storing unit 34 adds the blurred user identity information 47 to a list for service users in order to enter the user data.

After confirming that the verification result Result is OK and that the user identity information storing unit 34 has normally completed the user entry, the service data sending permitting unit 35 sends a service data sending permission signal to the service data sending unit 37.

The service data sending unit 37 sends service data stored in the service data storing unit 36 to the service using device 1 (S7 in FIG. 3). Conceivable service data includes contents of music and movie and information such as a map.

The service using device 1 then receives service data transmitted from the service providing device 3a (3b, 3c) in the service data receiving unit 18.

(Safety of Authentication System)

Next, a description is given of the safety regarding the following two points in this authentication system.

(1) Not being able to find out user identity information prior to blurring based on blurred identity authentication information.

(2) Not being able to generate false blurred identity authentication information based on identity authentication information by blurring it inappropriately.

First, (1) is described. In the blurred identity authentication information 49 shown in FIG. 13, the blurring process has been performed on the name information and address information. The only way to restore the original name information and address information before being blurred based on the blurred identity authentication information 49 is to inversely calculates (the numeric value data of) the name information m1 and (the numeric value data of) the address information m3 based on the intermediate hash values i1 (481) and i3 (483) included in the updated additional information 48 using the following expression.

$$i1 = \text{Hash}(m1 \| r1)$$

$$i3 = \text{Hash}(m3 \| r3)$$

Here, r1 and r3 denote random-number data which cannot be found out by an analyst who intends to obtain original information of the user identity from the blurred identity authentication information 49. Since Hash denotes a hash function, m1∥r1 cannot be calculated from the hash value i1 by inverse calculation. This forces the analyst to repeat such a trial of estimating m1∥r1 and checking whether or not the result obtained by calculating Hash is consistent with the estimated value. Thus, when a data size of m1∥r1 is sufficiently large, the number of trials needed for obtaining correct m1∥r1 is massive, and hence it is practically impossible to obtain correct m1∥r1 in terms of the amount of calculation. Further, as for the name information m1, the number of the above-mentioned trials is reduced because candidates can be narrowed to some extent by the use of the blurred name information "T. Y" (candidates are limited to names with initials of T. Y), but the random number r1 cannot be narrowed down as m1 since it is value given at random. Accordingly, so long as the random number has sufficient data length (for example, equal to or more than 64 bits), no safety problem occurs even when candidates of m1 can be narrowed down.

Next, the safety of (2) is described. In the embodiment, the service user instructs the service using device 1 to perform the blurring process on the name information 410 and the address information 412, and the service using device 1 performs the blurring process. The digital signature S is generated by the authentication device 2 in the following manner.

1. Appropriate information for blurring b1, b2, and b3 are generated with respect to the identity information m1, m2, and m3.

2. The random numbers r1, r2, and r3 are generated and the following i1, i2, and i3 are calculated.

$$i1 = \text{Hash}(m1 \| r1)$$

$$i2 = \text{Hash}(m2 \| r2)$$

$$i3 = \text{Hash}(m3 \| r3)$$

3. h1, h2, and h3 are calculated according to the following expressions.

$$h1 = \text{Hash}(i1 \| b1)$$

$$h2 = \text{Hash}(i2 \| b2)$$

$$h3 = \text{Hash}(i3 \| b3)$$

4. The digital signature S is generated using a signature key for h1∥h2∥h3.

When the blurring process is performed using information other than the information for blurring b1, b2, and b3 determined by the authentication device 2, in performing the blurring process, b1, b2, and b3 to be used in the final hash value calculation are calculated in the signature verification process as b1', b2', and b3' which are different from those at the time of generating the signature. Thus, final hash values h1', h2', h3' which are different from h1, h2, and h3 are obtained. Therefore, when any one of b1, b2, and b3 is a different value, signature verification is performed on a value different from h1∥h2∥h3, and thereby the signature verification fails.

As thus described, the service using device 1 substitutes initials "T. Y" and "Kinki Region" for the name "Taro Yamada/TARO YAMADA" and the address "1006 Kadoma, Kadoma City, Osaka Prefecture" respectively described in identity authentication information (identity certificate in the present embodiment), thereby "blurring" information, and can then send the information to the service providing device 3a.

In the present embodiment, it is not necessary to request the authentication device 2 to reissue identity authentication information each time of "blurring" identity authentication information, and hence a process load is not applied on the authentication device 2 when the identity authentication information is "blurred". Further, the service providing device 3a can confirm by signature verification that the "blurred" identity authentication information (blurred identity authentication information) has been generated by correctly "blurring" the original proper identity authentication information. Namely, an authentication system has been realized in which the blurring process can be performed on identity authentication information on the user side without a help of the authentication agency.

Further, it is possible in the authentication system of the present invention to realize a function that: for example, the authentication device adds a signature and the time when the signature is added in order to certify by identity authentication information indicating that "On December 3, 2003, the authentication agency (authentication device) authenticated that the user was 24 years old"; and that the user side then blurs the information to information indicating that "On December 3, 2003, the authentication agency (authentication device) authenticated that the user was in his or her twenties" and presents this blurred information to the service provider. On the other hand, this function cannot be realized in a configuration where reissuance of identity authentication information is requested to the authentication device 2 every time blurring is performed. This is because the authentication device adds the current time of reissuance at the time of the reissuance, and thus, for example, such reissuance undesirably modifies the identity authentication information to information certifying that "On March 31, 2005, the authentication agency (authentication device) authenticated that the user was in his or her twenties" and the content indicating "on December 3, 2003" is lost. This appears as a problem in an application where the authenticated time is important along with authenticated contents.

Note that, although letter information representing the identity of the user or the like is a subject in the present embodiment, the subject may be any information that can be taken out in numerical form, and may be, for example, image information or sound information.

Further the one-way function is not restricted to the hash function, and further, the hash method and digital signature method to be used are not restricted to specific methods.

Moreover, the number of pieces of user identity information is three: the name information, the age information, and the address information in this embodiment, but the present invention is not restricted to the number of pieces of and the kinds of information. Further, data as the subject of the authentication system is not restricted to the user identity information.

Furthermore, the authentication device generates information for blurring from the user identity information presented from the user in the present embodiment, but the user may generate this information for blurring and presents the generated information along with user identity information. In this case, the authentication device may confirm whether the information for blurring presented by the user has been correctly blurred using the user identity information, and when judging the information correct, the authentication device may issue identity authentication information.

Additionally, in the present embodiment, the information for blurring was generated by obscuring the contents of the user identity information, but the information for blurring is not restricted to this and may be generated to be logically consistent with the user identity information (or those information are in a relationship such that the contents of the information for blurring conceptually includes the contents of the user identity information). For example, in the case where the user identity information is "liking an apple" and the information for blurring is "liking a tangerine", those information are not logically inconsistent with each other. In that case, the service providing devices $3a$ to $3c$ may confirm that blurred information included in blurred authentication information sent from the service using device 1 is not logically inconsistent with corresponding certification information. Specifically, the service providing device may hold a list of pieces of blurred information which are not logically inconsistent with certification information, and when receiving blurred information listed in the list, it may judge that the certification information and the blurred information are not logically inconsistent with each other (or the blurred information and the certification information are in a relationship such that the contents of the blurred information conceptually includes the contents of the certification information). This allows the service providing devices $3a$ to $3c$ to find out that, when blurred information sent from the service using device 1 is "liking a tangerine" for example, that the information is not logically inconsistent with certification information "liking an apple", so as to judge that the blurred information is valid.

In the present embodiment, one piece of information for blurring corresponds to name information. However, in the case where plural pieces of information for blurring are present, the user may select one among the plural pieces of information for blurring to perform the blurring process at the time of performing the blurring process. The method is described below. In the present embodiment, a description has been given of an example case where the user identity information is made up of three pieces of identity information about a name, an age, and an address. Here, for simplicity, a description is given of a case where the user identity information is one piece of identity information. In this case, generation of a digital signature, the blurring process, and the digital signature verifying process in this embodiment can be summarized as follows.

(Generation of Digital Signature)

1. One piece of information for blurring (b) is determined with respect to identity information m.

2. A random number r is generated, and an intermediate hash value i and a final hash value h are calculated according to the following expressions.

$$i = \text{Hash}(m \| r) \quad \text{(Expression 1)}$$

$$h = \text{Hash}(i \| b) \quad \text{(Expression 2)}$$

3. A signature S is generated with respect to the final hash value h using a signature generation key.

4. The identity information m, information for blurring b, the random number r, and the signature S are sent as identity authentication information to the user.

(Blurring Process)

1. The intermediate hash value i is calculated from the identity information m and the random number r according to (Expression 1).

2. The blurred identity information b, the intermediate hash value i, and the signature S are sent as blurred identity authentication information to a signature verifier.

(Signature Verification)

1. The final hash value h is calculated from the blurred identity information b and the intermediate hash value i according to (Expression 2).

2. Signature verification is performed on the final hash value h and the signature S using the signature verification key.

Descriptions are given of two modifications (Modification 1, Modification 2) in the case of performing signature generation, a blurring process, and signature verification when there are plural pieces of information for blurring with respect to the identity information m. Here, the descriptions are given taking an example case where there are seven pieces of information for blurring (b1 to b7).

(Modification 1)
(Signature Generation)

1. Seven pieces of information for blurring b1 to b7 are generated with respect to the identity information m.

2. Eight random numbers r0 to r7 are generated to calculate hash values h000 to h111.

$$h000 = \text{Hash}(m \| r0)$$

$$h001 = \text{Hash}(b1 \| r1)$$

$$h010 = \text{Hash}(b2 \| r2)$$

$$h011 = \text{Hash}(b3 \| r3)$$

$$h100 = \text{Hash}(b4 \| r4)$$

$$h101 = \text{Hash}(b5 \| r5)$$

$$h110 = \text{Hash}(b6 \| r6)$$

$$h111 = \text{Hash}(b7 \| r7)$$

Figure 17:
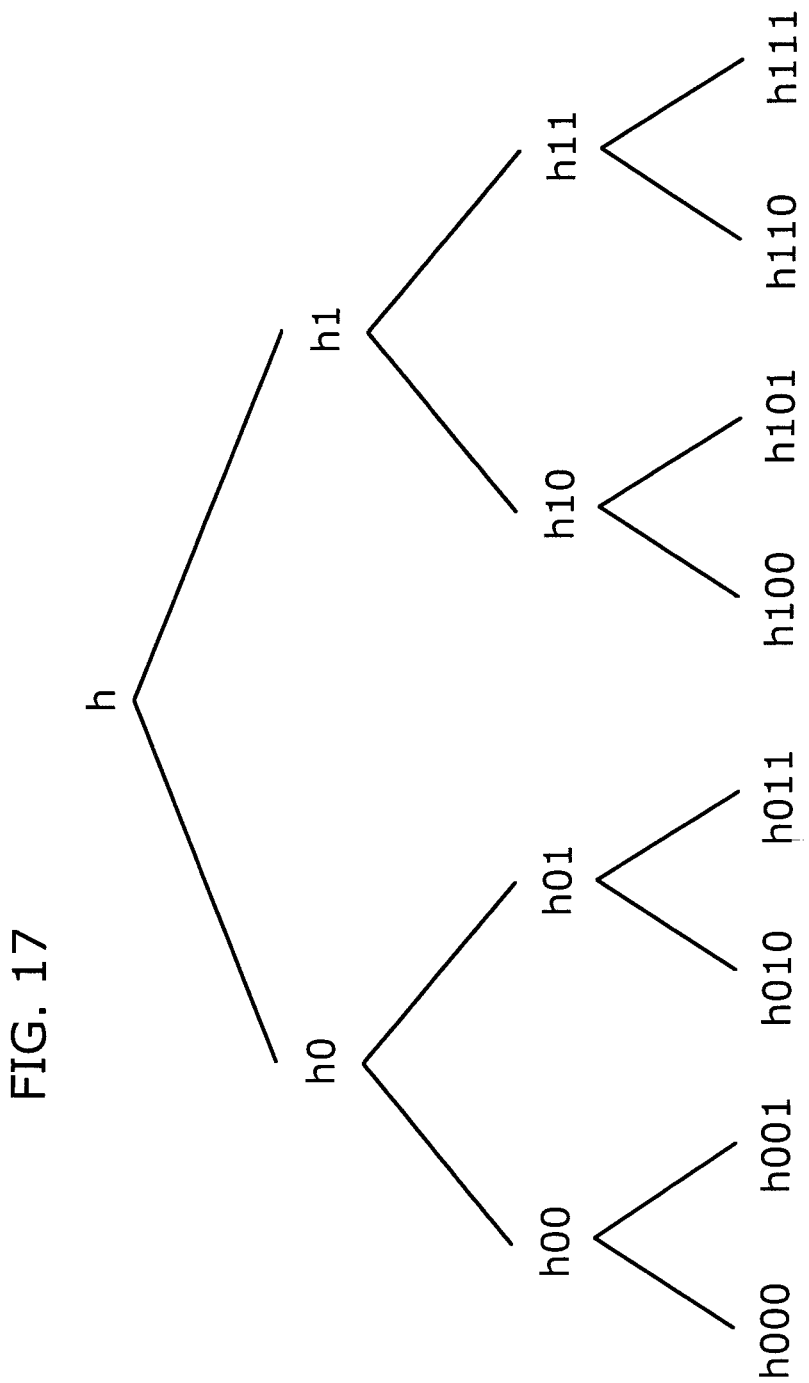
FIG. 17 is a view for explaining a hash calculation method according to a modification of the embodiment of the present invention.

3. The final hash value h is calculated according to a tree structure shown in FIG. 17. In this tree structure, h** (one "*" is 0 or 1) is calculated according to:

$$h = \text{Hash}(h0 \| h**1)$$

Further, h* is calculated according to:

$$h^* = \text{Hash}(h^*0 \| h^*1)$$

The final hash value h is calculated according to:

$$h = \text{Hash}(h0 \| h1)$$

3. The digital signature S is generated with respect to the final hash value h using the signature generation key.

4. The identity information m, the information for blurring b1 to b7, the random numbers r0 to r7, and the digital signature S are sent to the user.

(Blurring Process)

This process is described by taking as an example the case of performing a blurring process on the identity information m using the information for blurring b4.

1. The final hash value h is obtained by the same procedure as that in 2 of (Signature Generation).

Figure 18:
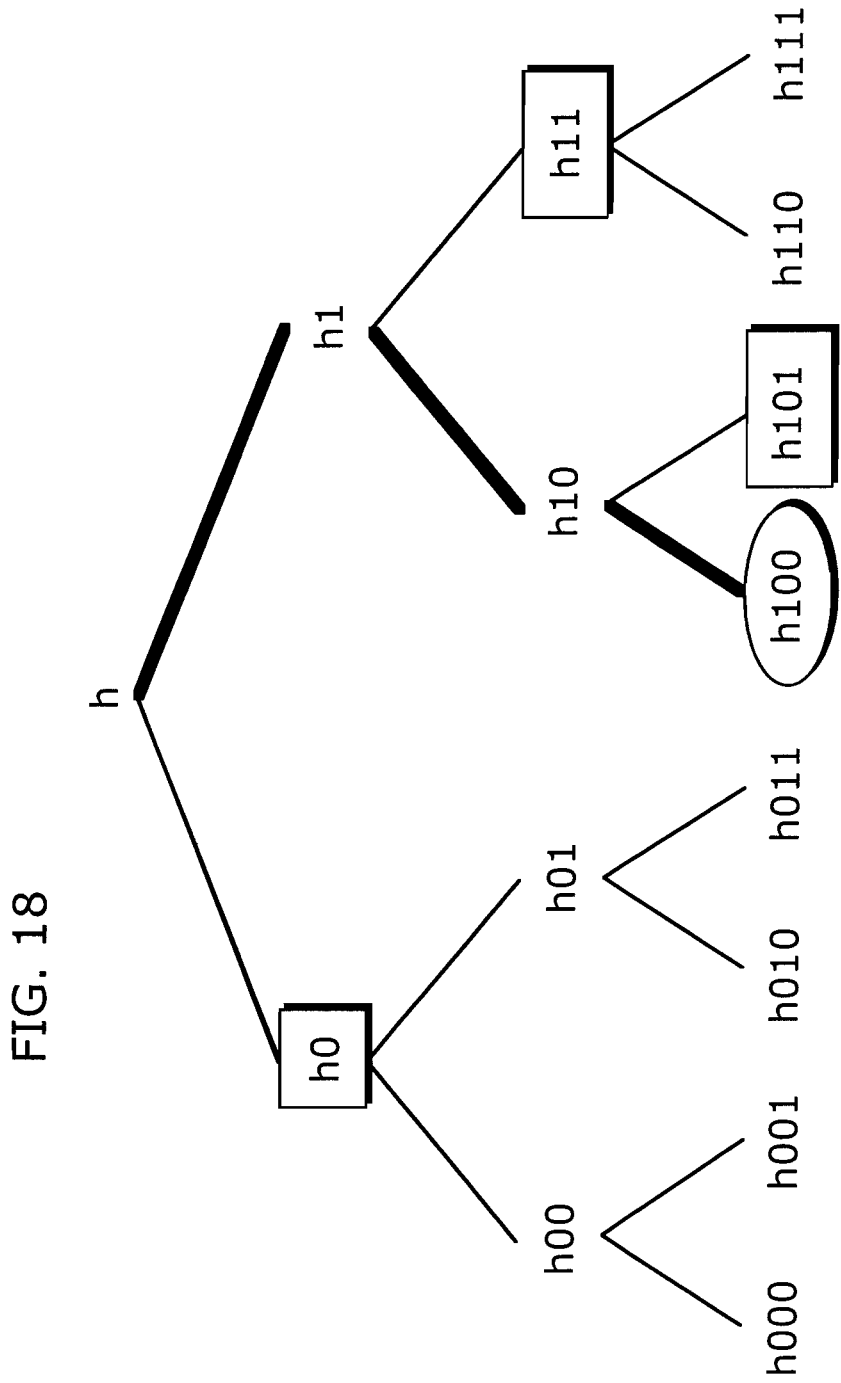
FIG. 18 is a view for explaining a hash calculation method according to a modification of the embodiment of the present invention.

2. A hash value to be sent to the signature verifier is selected in the following manner. First, an index "4" in the selected information for blurring b4 is converted into a binary number "100". Here, the last number 0 of "100" is inverted to obtain "101", and h101 is selected. Next, the last number of "100" is deleted to obtain "10". Here, the last number 0 of "10" is inverted to obtain "11", and h11 is selected. Further, the last number of "10" is deleted to obtain "1". 1 of "1" is inverted to obtain "0", and h0 is selected. According to the above procedure, h101, h11, and h0 are selected. This procedure can be described using the tree in FIG. 18. Namely, a path from the hash value h100 to the route corresponding to b4 (thick lines in the figure) is considered, and a hash value allocated to a child node which is not included in the path among child nodes of the nodes included in the path is selected.

3. The blurred identity information b4, the random number r4, the hash values h101, h11, and h0, and the signature S are sent as blurred identity authentication information to the signature verifier.

(Signature Verification)

1. The final hash value h is calculated from the blurred identity information b4, the random number r4, and the hash values h101, h11, and h0. Specifically, $$h100 = \text{Hash}(b4 \| r4),$$

is calculated, and the value is obtained by calculating:

$$h10 = \text{Hash}(h100 \| h101),$$

$$h1 = \text{hash}(h10 \| h11), \text{ and}$$

$$h = \text{Hash}(h0 \| h1).$$

2. Signature verification is performed on the final hash value h and the signature S using the signature verification key.

(Modification 2)
(Signature Generation)

1. Seven pieces of information for blurring b1 to b7 are generated with respect to the identity information m.

2. Eight random numbers r0 to r7 are generated to calculate the hash values h0 to h7.

$$h0 = \text{Hash}(m \| r0)$$

$$h1 = \text{Hash}(b1 \| r1)$$

$$h2 = \text{Hash}(b2 \| r2)$$

$$h3 = \text{Hash}(b3 \| r3)$$

$$h4 = \text{Hash}(b4 \| r4)$$

$$h5 = \text{Hash}(b5 \| r5)$$

$$h6 = \text{Hash}(b6 \| r6)$$

$$h7 = \text{Hash}(b7 \| r7)$$

3. The final hash value h is calculated according to:

$$h = \text{Hash}(h0 \| h1 \| h2 \| \ldots \| h7)$$

3. The digital signature S is generated with respect to the final hash value h using the signature generation key.

4. The identity information m, the information for blurring b1 to b7, the random numbers r0 to r7, and the digital signature S are sent to the user.

(Blurring Process)

This process is described by taking as an example the case of performing a blurring process on the identity information m using the information for blurring b4.

1. The final hash value h is obtained from the same procedure as that in 2. of (signature generation).

3. The blurred identity information b4, the random number r4, the hash values h0, h1, h2, h3, h5, h6, and h7, excluding h4 corresponding to the information for blurring b4, and the signature S are sent as blurred identity authentication information to the signature verifier.

(Signature Verification)

1. The final hash value h is calculated from the blurred identity information b4, the random number r4, and the hash values h0, h1, h2, h3, h5, h6, and h7. Specifically, $$h4 = \text{Hash}(b4 \| r4)$$

is calculated, and the value is obtained by calculating:

$$h = \text{Hash}(h0 \| h1 \| h2 \| \ldots \| h7)$$

2. The signature verification is performed on the final hash value h and the signature S using the signature verification key.

In either of the above modifications, an authentication system can be realized where plural pieces of information for blurring are settable with respect to one piece of identity information. Note that, in the two modifications above, the number of pieces of information for blurring is not necessarily plural (equal to or more than two), and the number of pieces of information for blurring may be one. Further, the case where the number of user identity information is one is described in the present modification, but the modification is also applicable by obvious extension to a case where there are plural pieces of user identity information.

Further, the electronic blurring function as in the present invention can also be realized in the following method obtained by improving the "electronic black-out technique" described as included in the Prior Art.

(Signature Generation)

1. The information for blurring b1 to b7 are generated from the identity information b0.

2. The electronic signature S is generated from b0 to b7 above using the electronic black-out technique.

3. b0 to b7 and S are sent to the user.

(Blurring Process)

1. One piece of information for blurring to be used in the blurring process is selected from b1 to b7. (It is assumed below that b3 is selected)).

2. Blacked-out data where b0 to b7 other than b3 have been "blacked out" is generated and sent as blurred authentication information to the signature verifier.

(Signature Verification)

1. The signature verification is performed on the blurred authentication information as "blacked-out data where data other than b3 are blacked out".

Note that, the present invention has been described according to the above-mentioned embodiment, but naturally, the present invention is not restricted to the embodiment. The following case is also included in the present invention.

(1) To be specific, the above-mentioned devices correspond to a computer system structured with a microprocessor, a ROM, a RAM, a hard disc unit, a display unit, a keyboard, a mouse and the like. A computer program is stored in the RAM or the hard disc unit. The microprocessor operates in accordance with the computer program so that the devices carry out the functions thereof. Here, the computer program is generated by combining plural command codes indicating commands to the computer so as to carry out prescribed functions.

(2) Part or all of the constituent elements constituting the above-mentioned devices may be structured with one system LSI (Large Scale Integration). The system LSI is a super-multifunctional LSI manufactured by integrating plural constitutional units on one chip, and specifically, a computer system configured as including a microprocessor, a ROM, a RAM, and the like. The computer program is stored in the RAM. The microprocessor operates in accordance with the computer program so that the system LSI carries out its functions.

(3) Part or all of the constituent elements constituting the above-mentioned devices may be structured with an IC card or a discrete module which are detachable from the devices. The IC card or the module is a computer system made up of a microprocessor, a ROM, a RAM, and the like. The IC card or the module may include the super-multifunctional LSI. The microprocessor operates in accordance with the computer program so that the IC card or the module carries out its functions. This IC card or module may be tamper-resistant.

(4) The present invention may be a method corresponding to the above. Further, the present invention may be a computer program which causes a computer to execute the method, or may be a digital signal representing the computer program.

Further, the present invention may be a computer-readable recording medium on which the computer program or the digital signal is recorded, and is, for example, a flexible disc, a hard disc, a CD-ROM, an MO, a DVD, a DVD-ROM, a DVD-RAM, a Blu-ray Disc (BD), or a semiconductor memory. Further, the present invention may be a digital signal recorded on such a recording medium.

Moreover, the present invention may be one which transmits the computer program or the digital signal via a telecommunication line, a wireless or wired communication line, a network represented by the Internet, data broadcast, or the like.

Furthermore, the present invention may be a computer system including a microprocessor and a memory, where the memory stores the computer program and the microprocessor operates in accordance with the computer program.

Additionally, the program or the digital signal may be recorded onto the recording medium and transferred, or the program or the digital signal may be transferred via the network or the like, so as to be implemented by another independent computer system.

(5) The constitutional elements in the embodiment and the modifications may be arbitrarily combined.

Industrial Applicability

An authentication system according to the present invention is a system which authenticates certificate data of personal information or the like, has a characteristic that it allows a user to perform a blurring process on information, especially on part of contents of authentication data generated by an authentication device without a help of the authentication device, and thus useful as a the user authentication system capable of making the user anonymous.

The invention claimed is:

1. An authentication system comprising:
a terminal which presents blurred identity information obtained by blurring certification information desired to be certified;
a verifying device which verifies validity of the blurred identity information presented by said terminal; and
an authentication device which supports said terminal to issue valid blurred identity information,
wherein said authentication device includes:
an information holding unit which holds at least one piece of certification information and at least one set of pieces of blurred identity information, each of the at least one set of pieces of blurred identity information corresponding to one of the at least one piece of certification information;
an authentication information generating unit which generates a digital signature by performing a digital signature generation process on information including the certification information and the blurred identity information which are held in said information holding unit, and generates, as authentication information, information which includes: the generated digital signature, the certification information, and the blurred identity information; and
a first transmission unit which transmits the generated authentication information to said terminal,
said terminal includes:
a first receiving unit which receives the authentication information transmitted from said authentication device;
a blurring instruction accepting unit which accepts an instruction of which piece of the blurred identity information is to be selected from the set of pieces of blurred identity information corresponding to the one of the at least one piece of certification information and included in the authentication information received by said first receiving unit according to the instruction from a user;
a blurred authentication information generating unit which generates, as blurred authentication information, information which includes: the digital signature, and the blurred identity information selected according to the instruction accepted by said blurring instruction accepting unit; and
a second transmission unit which transmits the generated blurred authentication information to said verifying device, and
said verifying device includes:
a second receiving unit which receives the blurred authentication information transmitted from said terminal; and
a signature verifying unit which verifies the validity of the blurred identity information included in the blurred authentication information according to the digital signature included in the blurred authentication information received by said receiving unit,
wherein the blurred identity information includes information that shows one or more characteristics of a user or a device, said authentication information generating unit includes:
a first intermediate value generating unit which generates a first intermediate value by performing a process on the certification information using a first one-way function; and
a signature generating unit which generates the digital signature using the generated first intermediate value and the blurred identity information corresponding to the certification information,
said blurred authentication information generating unit includes:
a second intermediate value generating unit which generates a second intermediate value by performing a process on the certification information using the first one-way function, the certification information corresponding to the blurred identity information selected according to the instruction accepted by said blurring instruction accepting unit; and
a data linking unit which links the generated second intermediate value, the blurred identity information, and the digital signature, so as to generate the blurred authentication information,
said signature verifying unit verifies the validity of the blurred identity information included in the blurred authentication information according to the second intermediate value and the digital signature which are included in the blurred authentication information,
said signature generating unit generates the digital signature from a value generated by performing a process on information using a second one-way function, the information including the first intermediate value and the blurred identity information, and
said signature verifying unit performs a process on information using the second one-way function, the information including the second intermediate value included in the blurred authentication information and the blurred identity information included in the blurred authentication information, and checks a consistency between the value obtained by performing the process on the information using the second one-way function and the digital signature included in the blurred authentication information, so as to verify the validity of the blurred identity information included in the blurred authentication information.

2. The authentication system according to claim 1,
wherein said authentication information generating unit further includes a random number generating unit which generates a random number,
said first intermediate value generating unit generates the first intermediate value by performing a process on information using the first one-way function, the information including the random number generated by said random number generating unit and the certification information,
said authentication information generating unit generates, as the authentication information, information which includes the digital signature, the certification information, the blurred identity information, and the random number, and
said second intermediate value generating unit generates the second intermediate value by performing a process on information using the first one-way function, the information including the random number included in the authentication information and the certification information.

3. The authentication system according to claim 1,
wherein the first and second one-way functions are hash functions.

4. The authentication system according to claim 1,
wherein said information holding unit holds a plurality of pieces of certification information and the at least one set of pieces of blurred identity information corresponding to each of the plurality of pieces of certification information;
said authentication information generating unit generates the digital signature by performing the digital signature generation process on information including the plurality of pieces of certification information and the at least one set of pieces of blurred identity information which are held in said information holding unit; and
said blurred authentication information generating unit substitutes the blurred identity information for the certification information corresponding to the blurred identity information selected according to the instruction accepted by said blurring instruction accepting unit from among the plurality of pieces of certification information included in the authentication information received by said receiving unit, and generates, as blurred authentication information, information which includes the certification information after the substitution, instruction information representing the instruction, and the digital signature.

5. The authentication system according to claim 1,
wherein the blurred identity information represents contents obtained by obscuring contents of the corresponding certification information.

6. The authentication system according to claim 1,
wherein the certification information includes identity information.

7. The authentication system according to claim 1,
wherein the blurred identity information and the certification information corresponding to the blurred identity information are in a relationship such that contents of the blurred identity information contain contents of the corresponding certification information, and
said signature verifying unit confirms that the blurred identity information included in the blurred authentication information and the certification information corresponding to the blurred authentication information are in the relationship such that the contents of the blurred identity information contain the contents of the corresponding certification information.

8. A terminal which is connected with a verifying device and an authentication device, and which presents desired blurred identity information,
wherein the verifying device verifies validity of the blurred identity information obtained by blurring certification information and the authentication device supports issuance of the blurred identity information, and
each of at least one set of pieces of blurred identity information corresponds to one of at least one piece of certification information,
said terminal comprising:
a receiving unit which receives authentication information transmitted from the authentication device;
a blurring instruction accepting unit which accepts an instruction of which piece of the blurred identity information is to be selected from the set of pieces of blurred identity information corresponding to the one of the at least one piece of certification information and included in the authentication information received by said receiving unit according to the instruction from a user;

a blurred authentication information generating unit which generates, as blurred authentication information, information which includes: a digital signature, and the blurred identity information selected according to the instruction accepted by said blurring instruction accepting unit; and a transmission unit which transmits the generated blurred authentication information to the verifying device, wherein the blurred identity information includes information that shows one or more characteristics of a user or a device, said blurred authentication information generating unit includes:

a second intermediate value generating unit which generates a second intermediate value by performing a process on the certification information using a first one-way function, the certification information corresponding to the blurred identity information selected according to the instruction accepted by said blurring instruction accepting unit; and a data linking unit which links the generated intermediate value, the blurred identity information, and the digital signature, so as to generate the blurred authentication information, the digital signature is generated by performing a digital signature generation process on information which includes: a first intermediate value obtained by performing a process, using the first one-way function, on the certification information; and the blurred identity information corresponding to the certification information, and the digital signature is generated from a value generated by performing a process on information using a second one-way function, the information including the first intermediate value and the blurred identity information.

9. A blurred identity information presenting method by which a terminal, which is connected with a verifying device and an authentication device, presents desired blurred identity information, the verifying device verifying validity of the blurred identity information obtained by blurring certification information and the authentication device supporting issuance of the blurred identity information, wherein each of at least one set of pieces of blurred identity information corresponds to one of at least one piece of certification information, said blurred identity information presenting method comprising:

a receiving step of receiving authentication information transmitted from the authentication device;

a blurring instruction accepting step of accepting an instruction of which piece of the blurred identity information is to be selected from the set of pieces of blurred identity information corresponding to the one of the at least one piece of certification information and included in the authentication information received in said receiving step according to the instruction from a user;

a blurred authentication information generating step of generating, as blurred authentication information, information which includes a digital signature and the blurred identity information selected according to the instruction accepted in said blurring instruction accepting step; and a transmission step of transmitting the generated blurred authentication information to the verifying device, wherein the blurred identity information includes information that shows one or more characteristics of a user or a device, said blurred authentication information generating step comprises:

a second intermediate value generating step of generating a second intermediate value by performing a process on the certification information using a first one-way function, the certification information corresponding to the blurred identity information selected according to the instruction accepted in said blurring instruction accepting step; and a data linking step of linking the generated intermediate value, the blurred identity information, and the digital signature, so as to generate the blurred authentication information, the digital signature is generated by performing a digital signature generation process on information which includes: a first intermediate value obtained by performing a process, using the first one-way function, on the certification information; and the blurred identity information corresponding to the certification information, and the digital signature is generated from a value generated by performing a process on information using a second one-way function, the information including the first intermediate value and the blurred identity information.

10. A non-transitory computer-readable medium having a program stored thereon, said program causing a computer to execute a blurred identity information presenting method by which a terminal, which is connected with a verifying device and an authentication device, presents desired blurred identity information, the verifying device verifying validity of the blurred identity information obtained by blurring certification information and the authentication device supporting issuance of the blurred identity information, wherein each of at least one set of pieces of blurred identity information corresponds to one of at least one piece of certification information, the blurred identity information presenting method comprising:

a receiving step of receiving authentication information transmitted from the authentication device;

a blurring instruction accepting step of accepting an instruction of which piece of the blurred identity information is to be selected from the set of pieces of blurred identity information corresponding to the one of the at least one piece of certification information and included in the authentication information received in said receiving step according to the instruction from a user;

a blurred authentication information generating step of generating, as blurred authentication information, information which includes a digital signature and the blurred identity information selected according to the instruction accepted in said blurring instruction accepting step; and a transmission step of transmitting the generated blurred authentication information to the verifying device, wherein the blurred identity information includes information that shows one or more characteristics of a user or a device, said blurred authentication information generating step comprises:

a second intermediate value generating step of generating a second intermediate value by performing a process on the certification information using a first one-way function, the certification information corresponding to the blurred identity information selected according to the instruction accepted in said blurring instruction accepting step; and a data linking step of linking the generated intermediate value, the blurred identity information, and the digital signature, so as to generate the blurred authentication information, the digital signature is generated by performing a digital signature generation process on information which includes: a first intermediate value obtained by performing a process, using the first one-way function, on the certification information; and the blurred identity information corresponding to the certification information, and the digital signature is generated from a value generated by performing a process on information using a second one-way function, the information including the first intermediate value and the blurred identity information.

11. A verifying device which is connected with a terminal, and which verifies validity of blurred identity information presented by the terminal, wherein the terminal presents the blurred identity information obtained by blurring certification information desired to be certified, and each of at least one set of pieces of blurred identity information corresponds to one of at least one piece of certification information, said verifying device comprising:

a receiving unit which receives blurred authentication information transmitted from the terminal; and a signature verifying unit which verifies the validity of the blurred identity information included in the blurred authentication information according to a second intermediate value and a digital signature which are included in the blurred authentication information received by the receiving unit, wherein the digital signature is generated by performing a digital signature generation process on information which includes: a first intermediate value obtained by performing a process, using a first one-way function, on the certification information; and the blurred identity information corresponding to the certification information, the second intermediate value is generated by performing a process, using the first one-way function, on the certification information corresponding to the blurred identity information selected according to an instruction from a user, the instruction being a selection of which piece of the blurred identity information is to be selected from the set of pieces of blurred identity information corresponding to the one of the at least one piece of certification information, said signature verifying unit performs a process on information using a second one-way function, the information including the second intermediate value included in the blurred authentication information and the blurred identity information included in the blurred authentication information, and checks a consistency between the value obtained by performing the process on the information using the second one-way function and the digital signature included in the blurred authentication information, so as to verify the validity of the blurred identity information included in the blurred authentication information, the blurred identity information includes information that shows one or more characteristics of a user or a device, the blurred authentication information is generated by linking the second intermediate value, the blurred identity information, and the digital signature, and the digital signature is generated from a value generated by performing a process on information using the second one-way function, the information including the first intermediate value and the blurred identity information.

12. A blurred identity information verifying method by which a verifying device, which is connected with a terminal, verifies validity of blurred identity information presented by the terminal, the terminal presenting the blurred identity information obtained by blurring certification information desired to be certified, wherein each of at least one set of pieces of blurred identity information corresponds to one of at least one piece of certification information, said blurred identity information verifying method comprising:

a receiving step of receiving blurred authentication information transmitted from the terminal; and a signature verifying step of verifying the validity of the blurred identity information included in the blurred authentication information according to a second intermediate value and a digital signature which are included in the blurred authentication information received in said receiving step, wherein the digital signature is generated by performing a digital signature generation process on information which includes: a first intermediate value obtained by performing a process, using a first one-way function, on the certification information; and the blurred identity information corresponding to the certification information, the second intermediate value is generated by performing a process, using the first one-way function, on the certification information corresponding to the blurred identity information selected according to an instruction from a user, the instruction being a selection of which piece of the blurred identity information is to be selected from the set of pieces of blurred identity information corresponding to the one of the at least one piece of certification information, said signature verification step includes:

performing a process on information using a second one-way function, the information including the second intermediate value included in the blurred authentication information and the blurred identity information included in the blurred authentication information; and checking a consistency between the value obtained in said performing and the digital signature included in the blurred authentication information, so as to verify the validity of the blurred identity information included in the blurred authentication information, the blurred identity information includes information that shows one or more characteristics of a user or a device, the blurred authentication information is generated by linking the second intermediate value, the blurred identity information, and the digital signature, and the digital signature is generated from a value generated by performing a process on information using the second one-way function, the information including the first intermediate value and the blurred identity information.

13. A non-transitory computer-readable medium having a program stored thereon, said program causing a computer to execute a blurred identity information verifying method by which a verifying device, which is connected with a terminal, verifies validity of blurred identity information presented by the terminal, the terminal presenting the blurred identity information obtained by blurring certification information desired to be certified, wherein each of at least one set of pieces of blurred identity information corresponds to one of at least one piece of certification information, the blurred identity information verifying method comprising:

a receiving step of receiving blurred authentication information transmitted from the terminal; and a signature verifying step of verifying the validity of the blurred identity information included in the blurred authentication information according to a second intermediate value and a digital signature which are included in the blurred authentication information received in said receiving step, wherein the digital signature is generated by performing a digital signature generation process on information which includes: a first intermediate value obtained by performing a process, using a first one-way function, on the certification information; and the blurred identity information corresponding to the certification information, the second intermediate value is generated by performing a process, using the first one-way function, on the certification information corresponding to the blurred identity information selected according to an instruction from a user, the instruction being a selection of which piece of the blurred identity information is to be selected from the set of pieces of blurred identity information corresponding to the one of the at least one piece of certification information, said signature verification step includes:

performing a process on information using a second one-way function, the information including the second intermediate value included in the blurred authentication information and the blurred identity information included in the blurred authentication information; and checking a consistency between the value obtained in said performing and the digital signature included in the blurred authentication information, so as to verify the validity of the blurred identity information included in the blurred authentication information, the blurred identity information includes information that shows one or more characteristics of a user or a device, the blurred authentication information is generated by linking the second intermediate value, the blurred identity information, and the digital signature, and the digital signature is generated from a value generated by performing a process on information using the second one-way function, the information including the first intermediate value and the blurred identity information.

* * * * *